United States Patent
Zweigle et al.

(10) Patent No.: US 11,927,692 B2
(45) Date of Patent: Mar. 12, 2024

(54) CORRECTING POSITIONS AFTER LOOP CLOSURE IN SIMULTANEOUS LOCALIZATION AND MAPPING ALGORITHM

(71) Applicant: FARO Technologies, Inc., Lake Mary, FL (US)

(72) Inventors: Oliver Zweigle, Stuttgart (DE); Mufassar Waheed, Ditzingen (DE); Ahmad Ramadneh, Kornwestheim (DE); Aleksej Frank, Kornwestheim (DE)

( * ) Notice: Subject to any disclaimer, the term of this patent is extended or adjusted under 35 U.S.C. 154(b) by 820 days.

(21) Appl. No.: 17/070,330

(22) Filed: Oct. 14, 2020

(65) Prior Publication Data

US 2021/0141061 A1    May 13, 2021

Related U.S. Application Data

(60) Provisional application No. 62/934,636, filed on Nov. 13, 2019.

(51) Int. Cl.
*G01C 3/08* (2006.01)
*G01S 7/48* (2006.01)
(Continued)

(52) U.S. Cl.
CPC ............ *G01S 7/4808* (2013.01); *G01S 17/86* (2020.01); *G01S 17/87* (2013.01); *G01S 17/89* (2013.01)

(58) Field of Classification Search
CPC ........ G01S 7/4808; G01S 17/86; G01S 17/87; G01S 17/89
See application file for complete search history.

(56) References Cited

U.S. PATENT DOCUMENTS 8,705,012 B2    4/2014 Greiner et al.
8,705,016 B2    4/2014 Schumann et al.
(Continued)

FOREIGN PATENT DOCUMENTS

EP    39992660 A1 *    5/2022    ............ G01S 17/89

OTHER PUBLICATIONS

Censi; "An ICP Variant Using a Point-to-Line Metric"; Proceedings—IEEE International Conference on Robotics and Automation; Jun. 2008; 7 Pages.

*Primary Examiner* — Mark Hellner
(74) *Attorney, Agent, or Firm* — McCarter & English, LLP; Dave S. Christensen

(57) ABSTRACT

A method and system for generating a three-dimensional (3D) map of an environment is provided. An example method includes receiving a 3D scan and portions of a 2D map of the environment and receiving coordinates of the scan position in the 2D map. The method further includes associating the coordinates of the scan position with the portion of the 2D map. The method further includes linking the coordinates with the portion of the 2D map. The method further includes storing submap data for each of the plurality of submaps into a data object associated respective submaps. The method further includes performing a loop closure algorithm on each of the plurality of submaps. The method further includes, for each of the plurality of submaps for which the position anchor of the submap changed during performing the loop closure algorithm, determining a new data object position for the data objects.

20 Claims, 23 Drawing Sheets

(51) Int. Cl.
   *G01S 17/86* (2020.01)
   *G01S 17/87* (2020.01)
   *G01S 17/89* (2020.01)

(56) References Cited

U.S. PATENT DOCUMENTS

| | | | |
|---|---|---|---|
| 10,318,659 B1* | 6/2019 | Hess | G06F 30/13 |
| 2012/0069352 A1 | 3/2012 | Ossig et al. | |
| 2014/0005933 A1* | 1/2014 | Fong | G01C 21/3881 |
| | | | 701/447 |
| 2017/0343674 A1* | 11/2017 | Zweigle | G01S 17/36 |
| 2019/0325592 A1 | 10/2019 | Zweigle et al. | |
| 2020/0109937 A1 | 4/2020 | Zweigle et al. | |

* cited by examiner

2D SCANNER
FRAME OF REFERENCE

OBJECT
FRAME OF REFERENCE

CORRECTING POSITIONS AFTER LOOP CLOSURE IN SIMULTANEOUS LOCALIZATION AND MAPPING ALGORITHM

CROSS REFERENCE TO RELATED APPLICATIONS

This application claims the benefit of U.S. Provisional Application Ser. No. 62/934,636, filed Nov. 13, 2019, the entire disclosure of which is incorporated herein by reference.

BACKGROUND

The subject matter disclosed herein relates to use of a 3D laser scanner time-of-flight (TOF) coordinate measurement device. A 3D laser scanner of this type steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations, and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

In some cases, a TOF laser scanner can be used in conjunction with other devices, such as a 2D scanner, to generate a map of a physical space. This can be useful for determining as-built floor plans, reconstructing accident scenes, creating virtual or augmented reality environments, and the like. Simultaneous localization and mapping can be used to construct or update a map of an unknown environment while simultaneously tracking an agent's (such as a robot) location within it.

Generating an image requires at least three values for each data point. These three values may include the distance and two angles, or may be transformed values, such as the x, y, z coordinates. In some cases, an image is also based on a fourth gray-scale value, which is a value related to irradiance of scattered light returning to the scanner.

Most TOF scanners direct the beam of light within the measurement volume by steering the light with a beam steering mechanism. The beam steering mechanism includes a first motor that steers the beam of light about a first axis by a first angle that is measured by a first angular encoder (or other angle transducer). The beam steering mechanism also includes a second motor that steers the beam of light about a second axis by a second angle that is measured by a second angular encoder (or other angle transducer).

Many contemporary laser scanners include a camera mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space. In addition, the camera digital images may be transmitted to a processor to add color to the scanner image. To generate a color scanner image, at least three positional coordinates (such as x, y, z) and three color values (such as red, green, blue "RGB") are collected for each data point.

A 3D image of a scene may utilize multiple scans from different registration positions. The overlapping scans are registered in a joint coordinate system, for example, as described in U.S. Published Patent Application No. 2012/0069352 ('352), the contents of which are incorporated herein by reference. Such registration is performed by matching targets in overlapping regions of the multiple scans. The targets may be artificial targets such as spheres or checkerboards or they may be natural features such as corners or edges of walls. Some registration procedures involve relatively time-consuming manual procedures such as identifying by a user each target and matching the targets obtained by the scanner in each of the different registration positions. Some registration procedures also require establishing an external "control network" of registration targets measured by an external device such as a total station.

However, even with these improvements, it remains difficult to remove the need for a user to carry out the manual registration steps as described above. In a typical case, only 30% of 3D scans can be automatically registered to scans taken from other registration positions. Today such registration is seldom carried out at the site of the 3D measurement but instead in a remote location following the scanning procedure. In a typical case, a project requiring a week of scanning requires two to five days to manually register the multiple scans. This adds to the cost of the scanning project. Furthermore, the manual registration process sometimes reveals that the overlap between adjacent scans was insufficient to provide proper registration. In other cases, the manual registration process may reveal that certain sections of the scanning environment have been omitted. When such problems occur, the operator must return to the site to obtain additional scans. In some cases, it is not possible to return to a site. A building that was available for scanning at one time may be impossible to access at a later time for example. Further, a forensics scene of an automobile accident or a homicide is often not available for taking of scans for more than a short time after the incident.

Accordingly, while existing 3D scanners are suitable for their intended purposes, what is needed is a 3D scanner having certain features of embodiments described herein.

SUMMARY

According to one or more examples, a three-dimensional (3D) measuring device includes a processor system including at least one of a 3D scanner controller and a two-dimensional (2D) scanner processor. The 3D measuring device further includes a 3D scanner operable to cooperate with the processor system to determine 3D coordinates. The 3D measuring device further includes a 2D scanner accessory including a 2D scanner operable to cooperate with the processor system to determine 2D coordinates. The 3D measuring device further includes a moveable platform operable to carry the 3D scanner and the 2D scanner, the 3D scanner being fixed relative to the 2D scanner. The processor system is responsive to executable instructions which when executed by the processor system is operable to cause the 3D scanner, while fixedly located at a scan position, to cooperate with the processor system to acquire a 3D scan of an environment, wherein the 3D scan comprises a global position and is partitioned into a plurality of submaps, each of the plurality of submaps comprising a position anchor. The processor system is responsive to executable instructions which when executed by the processor system is further operable to cause the 2D scanner to cooperate with the processor system to acquire a portion of a 2D map of the environment. The processor system is responsive to executable instructions which when executed by the processor system is further operable to cause the 2D scanner to determine coordinates of the scan position in the 2D map in response to the 3D scanner initiating the acquisition of the 3D scan. The processor system is responsive to executable instructions which when executed by the processor system is further operable to link the coordinates of the scan position with the portion of the 2D map. The processor system is responsive to executable instructions which when executed by the processor system is further operable to store submap data for each of the plurality of submaps into a data object associated with each of the plurality of submaps, wherein the submap data for each of the plurality of submaps comprises a data object position of the data object relative to the position anchor of the respective submap. The processor system is responsive to executable instructions which when executed by the processor system is further operable to perform a loop closure algorithm on each of the plurality of submaps. The processor system is responsive to executable instructions which when executed by the processor system is further operable to, for each of the plurality of submaps for which the position anchor of the submap changed during performing the loop closure algorithm, determine a new data object position for the data objects associated with each of the plurality of submaps for which the position anchor changed.

According to one or more examples, a method for generating a three-dimensional (3D) map of an environment. The method includes receiving, by a processor system, via a 3D scanner, which is fixedly located at a scan position, a 3D scan of the environment, wherein the 3D scan comprises a global position and is partitioned into a plurality of submaps, each of the plurality of submaps comprising a position anchor. The method further includes receiving, by the processor system, via a two-dimensional (2D) scanner accessory, a portion of a 2D map of the environment. The method further includes receiving, by the processor system, coordinates of the scan position in the 2D map in response to the 3D scanner initiating the acquisition of the 3D scan. The method further includes associating, by the processor system, the coordinates of the scan position with the portion of the 2D map. The method further includes linking, by the processor system, the coordinates of the scan position with the portion of the 2D map. The method further includes storing, by the processor system, submap data for each of the plurality of submaps into a data object associated with each of the plurality of submaps, wherein the submap data for each of the plurality of submaps comprises a data object position of the data object relative to the position anchor of the respective submap. The method further includes performing, by the processor system, a loop closure algorithm on each of the plurality of submaps. The method further includes, for each of the plurality of submaps for which the position anchor of the submap changed during performing the loop closure algorithm, determining, by the processor system, a new data object position for the data objects associated with each of the plurality of submaps for which the position anchor changed.

BRIEF DESCRIPTION OF THE DRAWINGS

The subject matter, which is regarded as the invention, is particularly pointed out and distinctly claimed in the claims at the conclusion of the specification. The foregoing and other features, and advantages of embodiments of the invention are apparent from the following detailed description taken in conjunction with the accompanying drawings in which:

DETAILED DESCRIPTION

The technical solutions described herein generally relate to a device that includes a 3D scanner and a 2D scanner working cooperatively to provide automatic registration of 3D scans.

Figure 1:
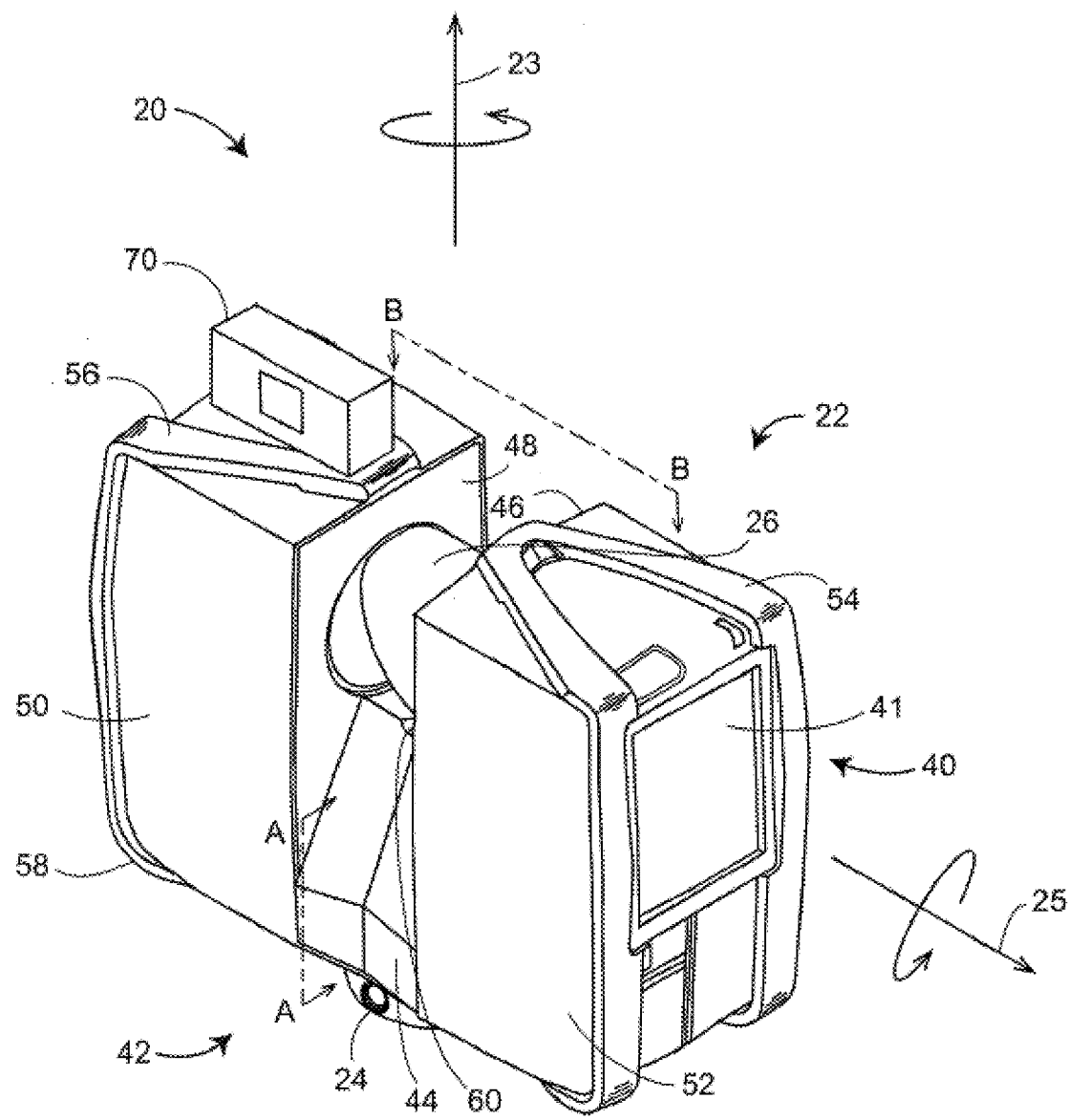
FIG. 1 is a perspective view of a laser scanner according to one or more embodiments described herein.
Figure 2:
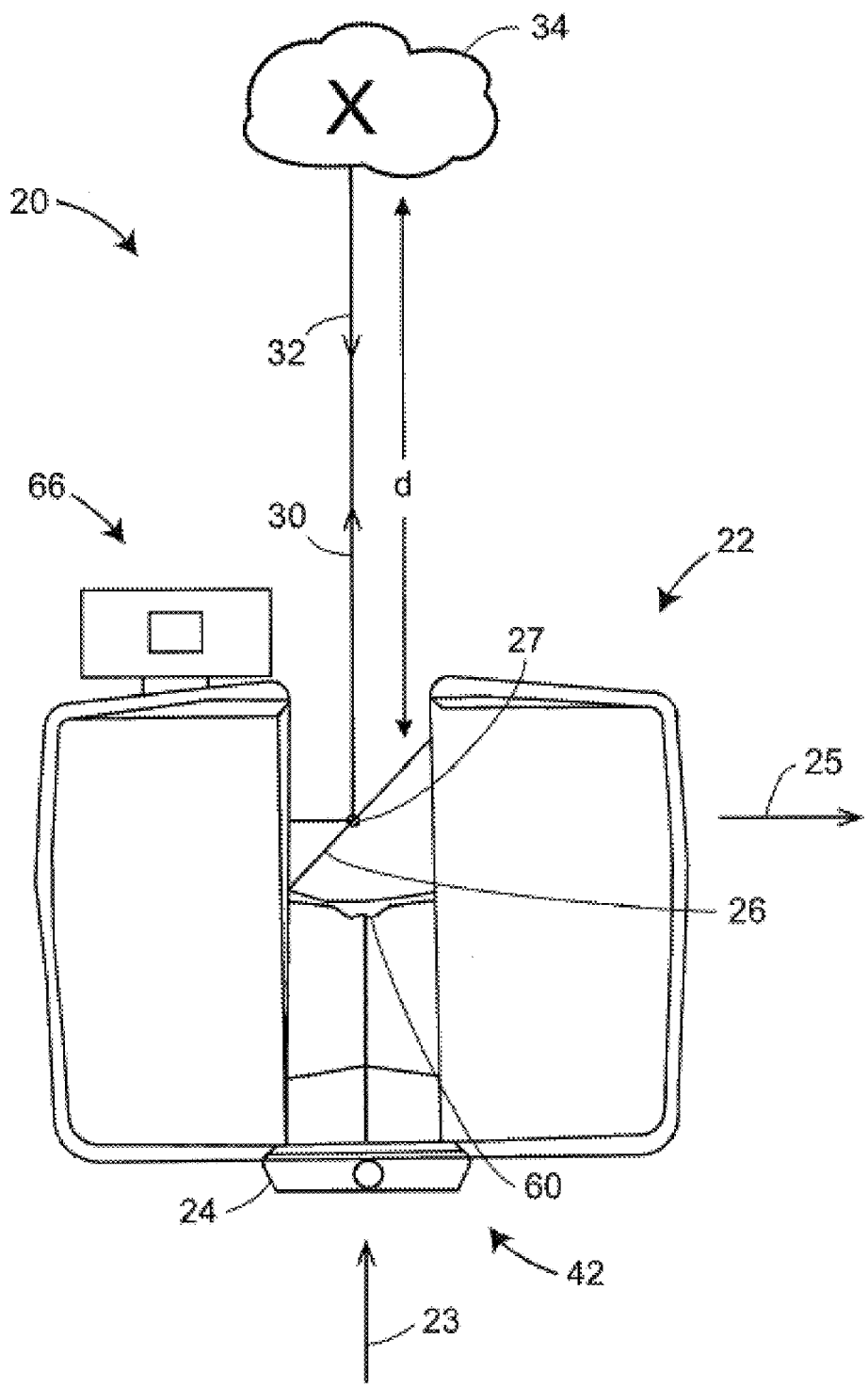
FIG. 2 is a side view of the laser scanner of FIG. 1 illustrating a method of measurement according to one or more embodiments described herein.
Figure 3:
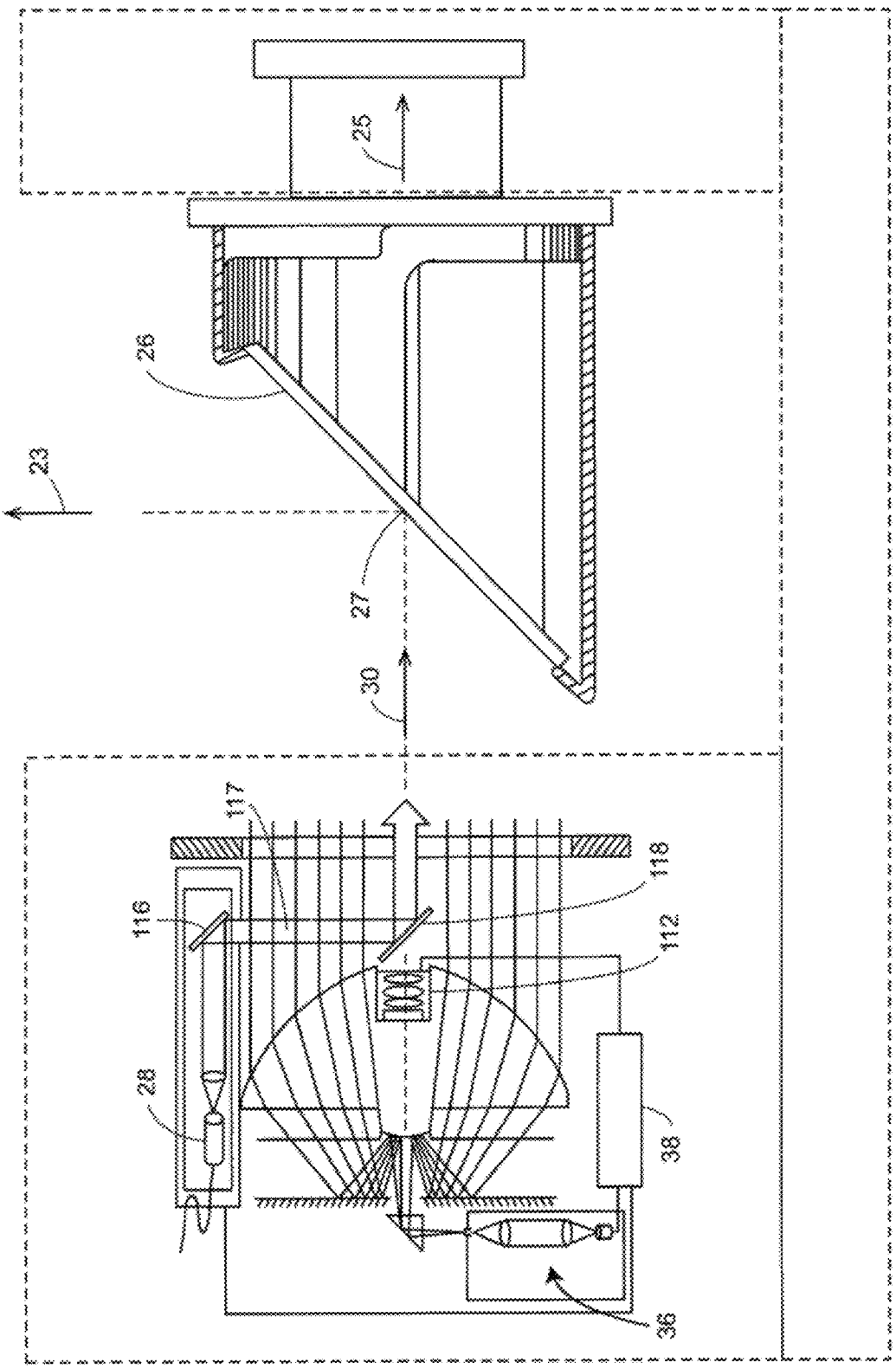
FIG. 3 is a schematic illustration of the optical, mechanical, and electrical components of the laser scanner of FIG. 1 according to one or more embodiments described herein.

Referring now to FIGS. 1-3, a laser scanner 20 is shown for optically scanning and measuring the environment surrounding the laser scanner 20. The laser scanner may be the same as that described in commonly owned U.S. Pat. No. 8,705,016, the contents of which are incorporated herein by reference. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side, upside down, or on an angle, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 may be amplitude or intensity modulated, for example, with a sinusoidal waveform or with a rectangular waveform. The emitted light beam 30 is emitted by the light emitter 28 onto the rotary mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25, 23, respectively. These angular positions in turn depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$.

A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 about axis 25 relatively quickly while rotating the measuring head 22 about axis 23 relatively slowly, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received optical power (equivalent to the term "brightness.") The gray-scale value may be determined at least in part, for example, by integration of the bandpass-filtered and amplified signal in the light receiver 36 over a measuring period attributed to the object point X.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 54. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor that is configured to rotate the measuring head 22 about the axis 23.

An auxiliary image acquisition device 66 may be a device that captures and measures a parameter associated with the scanned volume or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector for example.

In an embodiment, a camera (first image acquisition device) 112 is located internally to the scanner and may have the same optical axis as the 3D scanner device. In this embodiment, the first image acquisition device 112 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The digital camera 112 takes 2D photographic images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 4:
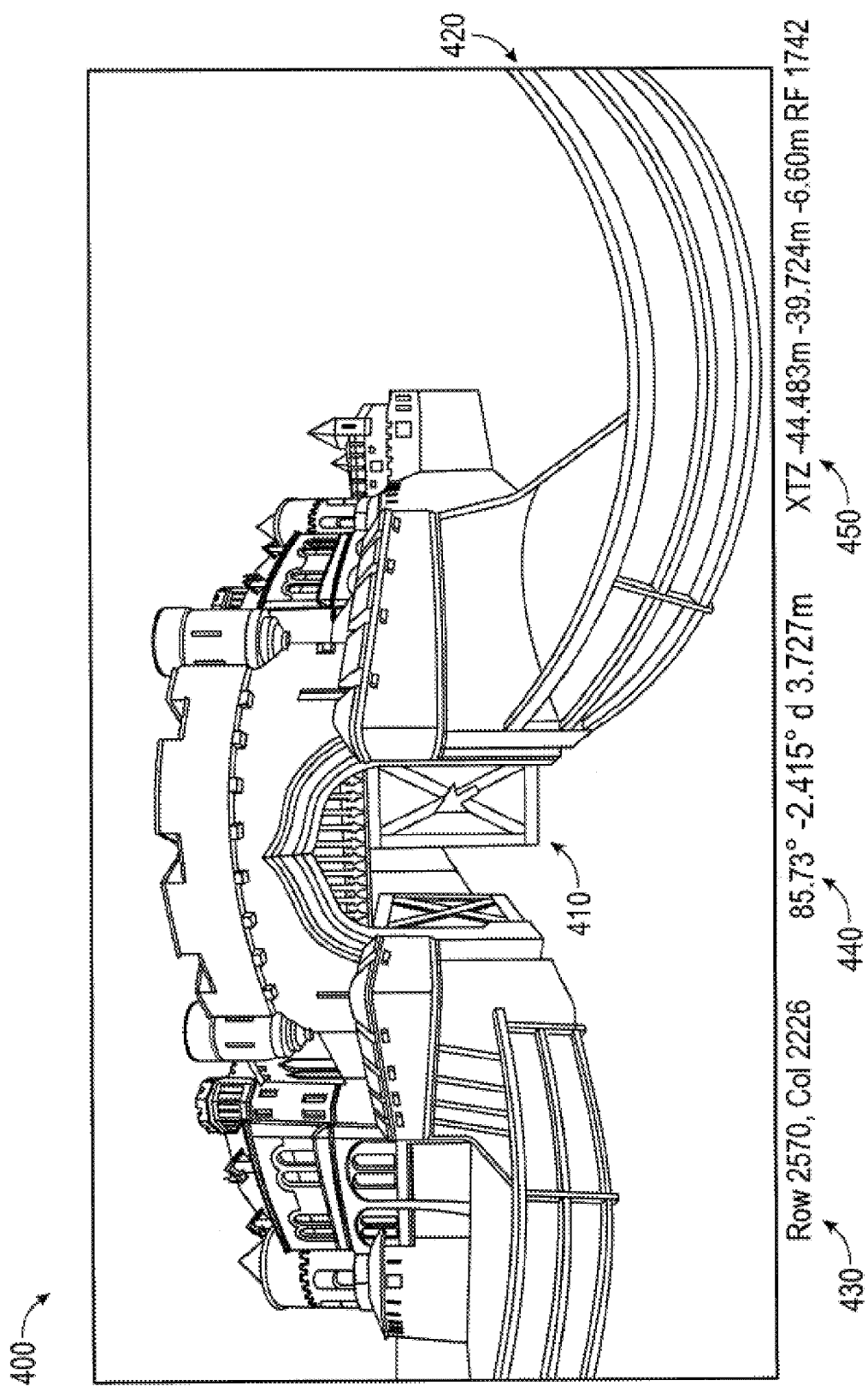
FIG. 4 is a planar view of a 3D scanned image according to one or more embodiments described herein.

FIG. 4 depicts an example of a planar view of a 3D scanned image 400. The planar view depicted in FIG. 4 maps an image based on direct mapping of data collected by the scanner. The scanner collects data in a spherical pattern but with data points collected near the poles more tightly compressed than those collected nearer the horizon. In other words, each point collected near a pole represents a smaller solid angle than does each point collected nearer the horizon. Since data from the scanner may be directly represented in rows and column, data in a planar image is conveniently presented in a rectilinear format, as shown in FIG. 4. With planar mapping described above, straight lines appear to be curved, as for example the straight fence railings 420 that appear curved in the planar view of the 3D image. The planar view may be a 3D unprocessed scanned image displaying just the gray-scale values received from the distance sensor arranged in columns and rows as they were recorded. In addition, the 3D unprocessed scanned image of the planar view may be in full resolution or reduced resolution depending on system characteristics (e.g., display device, storage, processor). The planar view may be a 3D processed scanned image that depicts either gray-scale values (resulting from the light irradiance measured by the distance sensor for each pixel) or color values (resulting from camera images which have been mapped onto the scan). Although the planar view extracted from the 3D scanner is ordinarily a gray-scale or color image, FIG. 4 is shown as a line drawing for clarity in document reproduction. The user interface associated with the display unit, which may be integral to the laser scanner, may provide a point selection mechanism, which in FIG. 4 is the cursor 410. The point selection mechanism may be used to reveal dimensional information about the volume of space being measured by the laser scanner. In FIG. 4, the row and column at the location of the cursor are indicated on the display at 430. The two measured angles and one measured distance (the 3D coordinates in a spherical coordinate system) at the cursor location are indicated on the display at 440. Cartesian XYZ coordinate representations of the cursor location are indicated on the display at 450.

Figure 5:
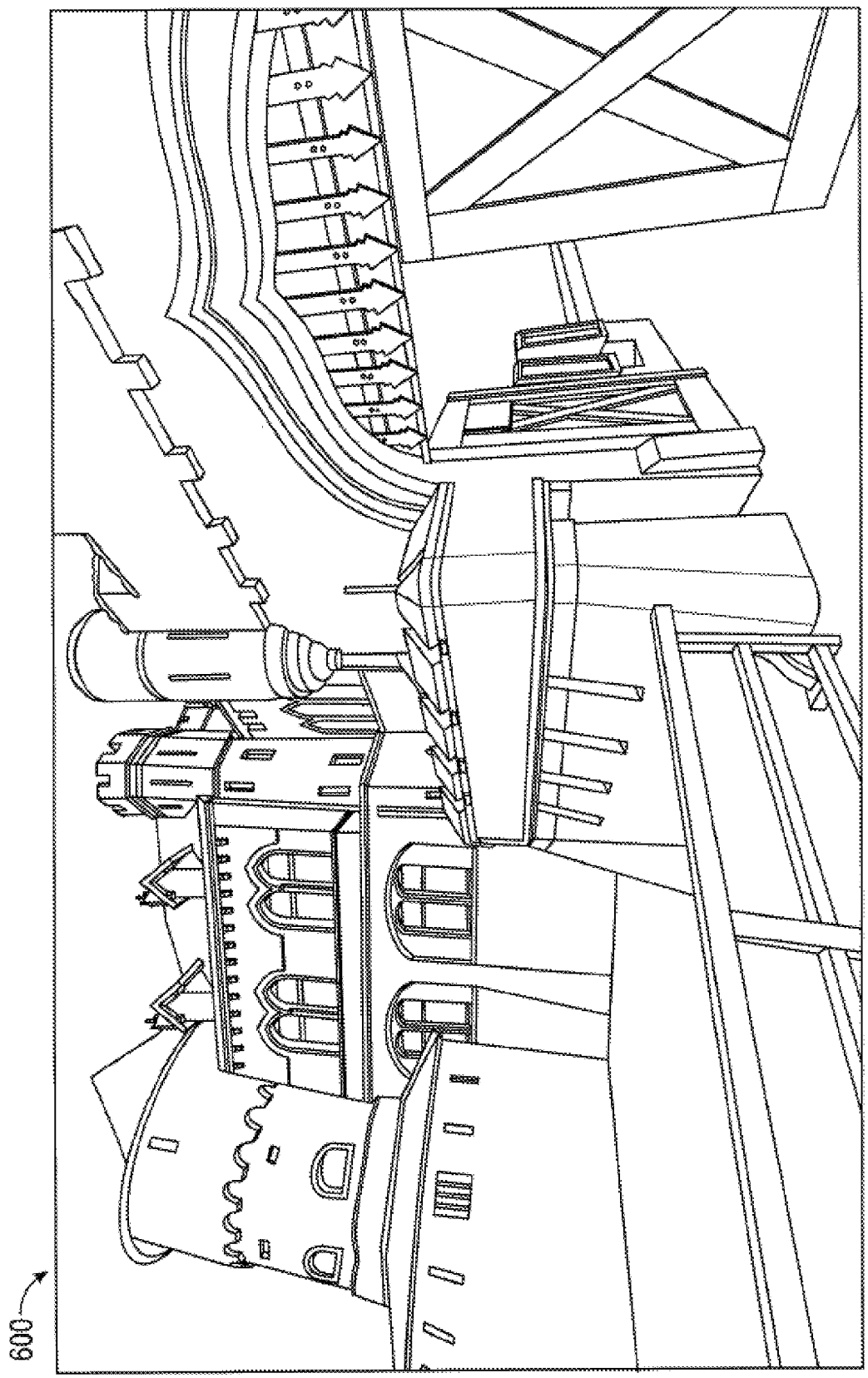
FIG. 5 is a panoramic view of a 3D scanned image generated by mapping a planar view onto a sphere according to one or more embodiments described herein.

FIG. 5 depicts an example of a panoramic view of a 3D scanned image 600 generated by mapping a planar view onto a sphere, or in some cases a cylinder. A panoramic view can be a 3D processed scanned image (such as that shown in FIG. 5) in which 3D information (e.g., 3D coordinates) is available. The panoramic view may be in full resolution or reduced resolution depending on system characteristics. It should be pointed out that an image such as FIG. 5 is a 2D image that represents a 3D scene when viewed from a particular perspective. In this sense, the image of FIG. 5 is much like an image that might be captured by a 2D camera or a human eye. Although the panoramic view extracted from the 3D scanner is ordinarily a gray-scale or color image, FIG. 5 is shown as a line drawing for clarity in document reproduction.

The term panoramic view refers to a display in which angular movement is generally possible about a point in space, but translational movement is not possible (for a single panoramic image). In contrast, the term 3D view as used herein refers to generally refers to a display in which provision is made (through user controls) to enable not only rotation about a fixed point but also translational movement from point to point in space.

Figure 6A:
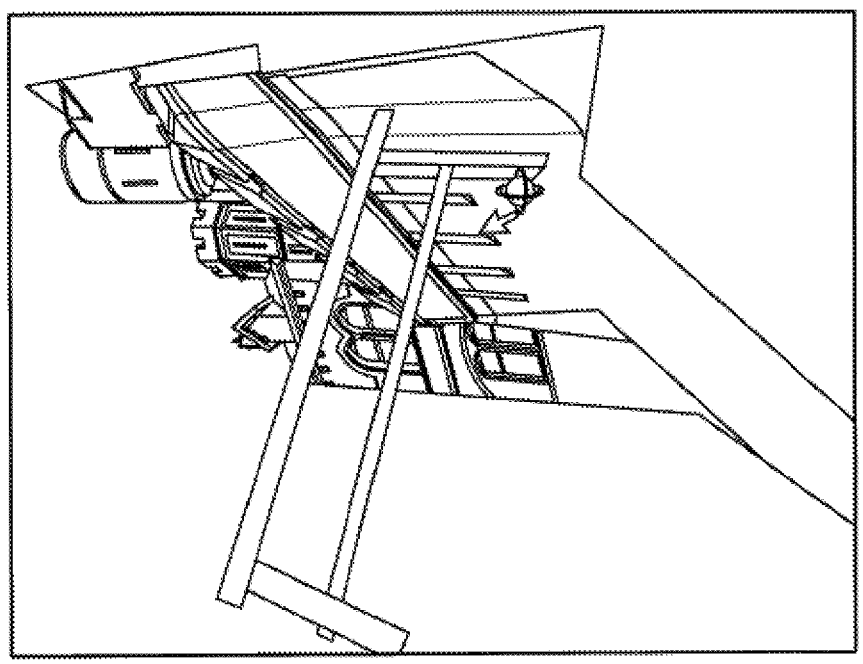
FIGS. 6A, 6B, and 6C are 3D views of 3D scanned images according to one or more embodiments described herein.
Figure 6B:
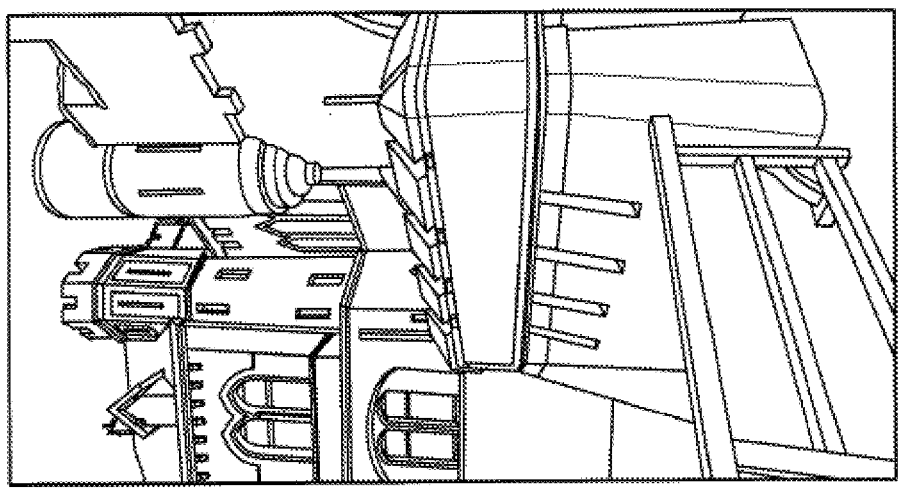
Figure 6C:
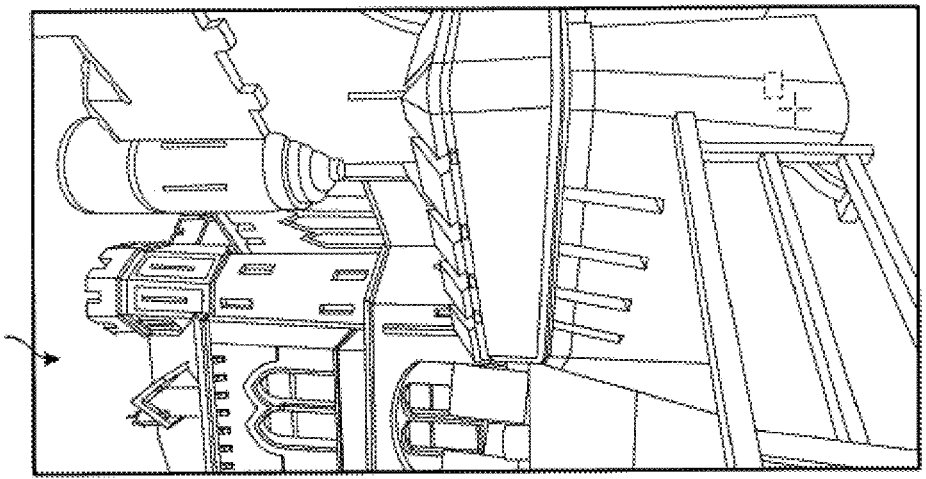
Figure 7:
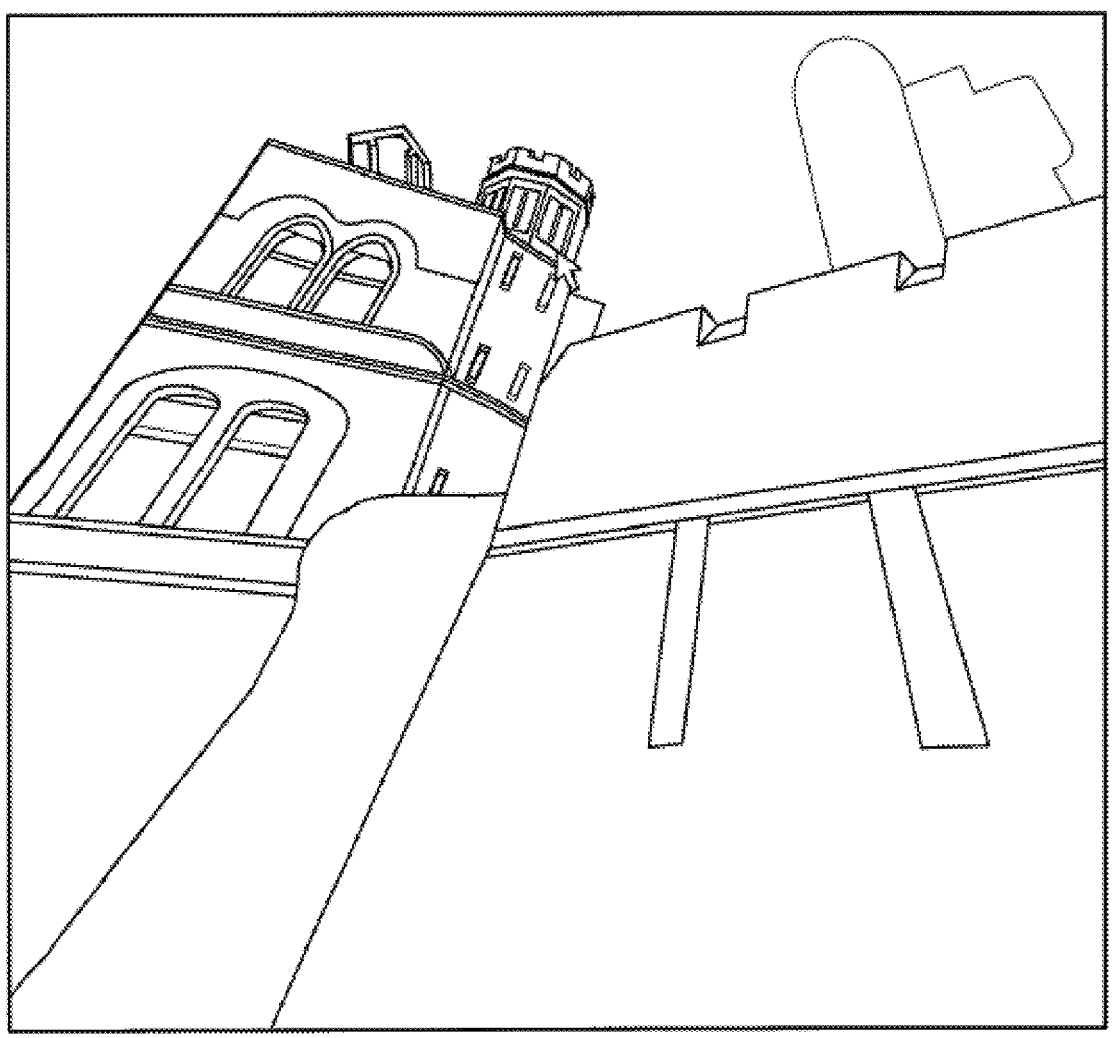
FIG. 7 is a 3D view made up of an image of the object of FIG. 6B but viewed from a different perspective and shown only partially according to one or more embodiments described herein.

FIGS. 6A, 6B, and 6C depict an example of a 3D view of a 3D scanned image. In the 3D view a user can leave the origin of the scan and see the scan points from different viewpoints and angles. The 3D view is an example of a 3D processed scanned image. The 3D view may be in full resolution or reduced resolution depending on system characteristics. In addition, the 3D view allows multiple registered scans to be displayed in one view. FIG. 6A is a 3D view 700 over which a selection mask 730 has been placed by a user. FIG. 6B is a 3D view 740 in which only that part of the 3D view 700 covered by the selection mask 730 has been retained. FIG. 6C shows the same 3D measurement data as in FIG. 6B except as rotated to obtain a different view 760. FIG. 7 shows a different view 780 of FIG. 6B, the view in this instance being obtained from a translation and rotation of the observer viewpoint, as well as a reduction in observed area. Although the 3D views extracted from the 3D scanner are ordinarily a gray-scale or color image, FIGS. 6A-C and 7 are shown as line drawings for clarity in document reproduction.

Figure 8:
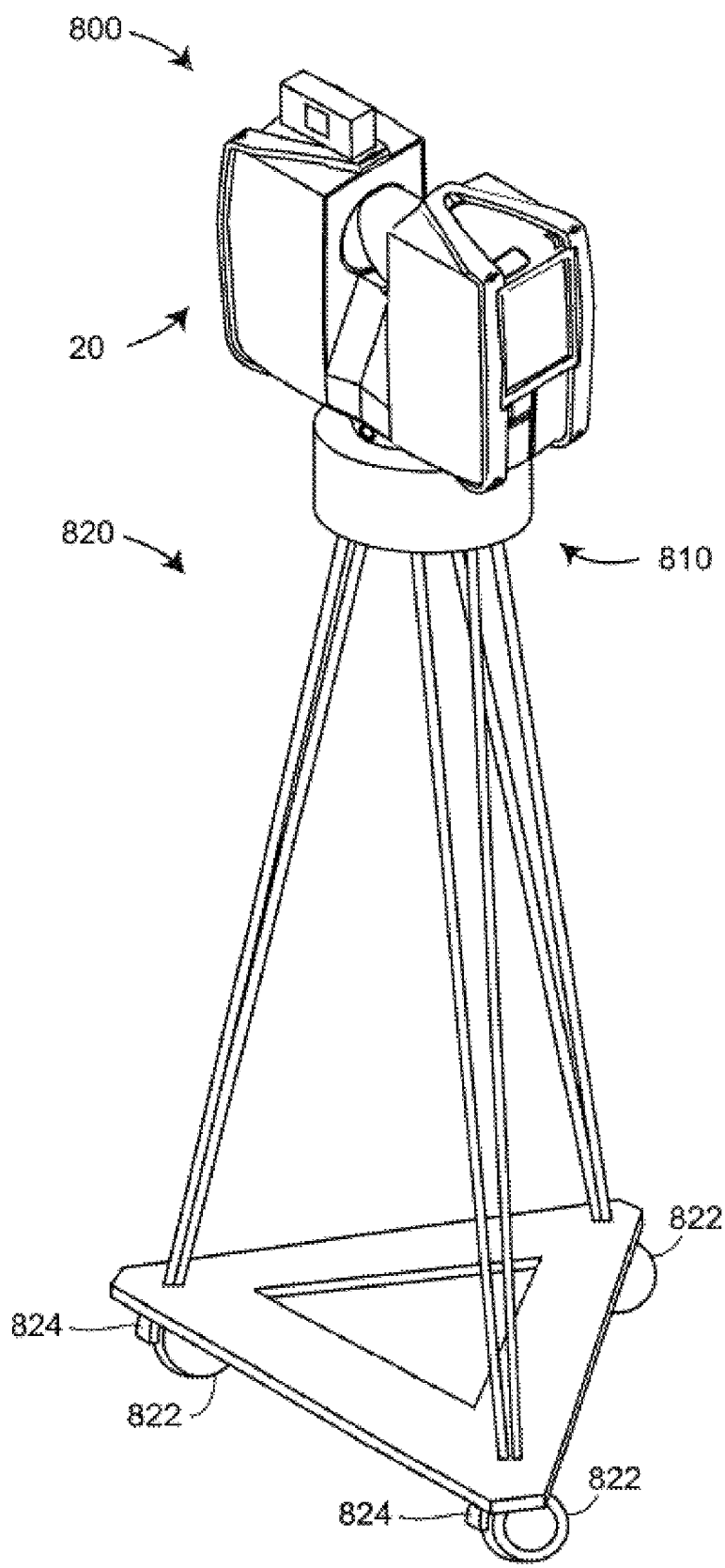
FIG. 8 is a perspective view of a 3D measuring device according to one or more embodiments described herein.
Figure 9:
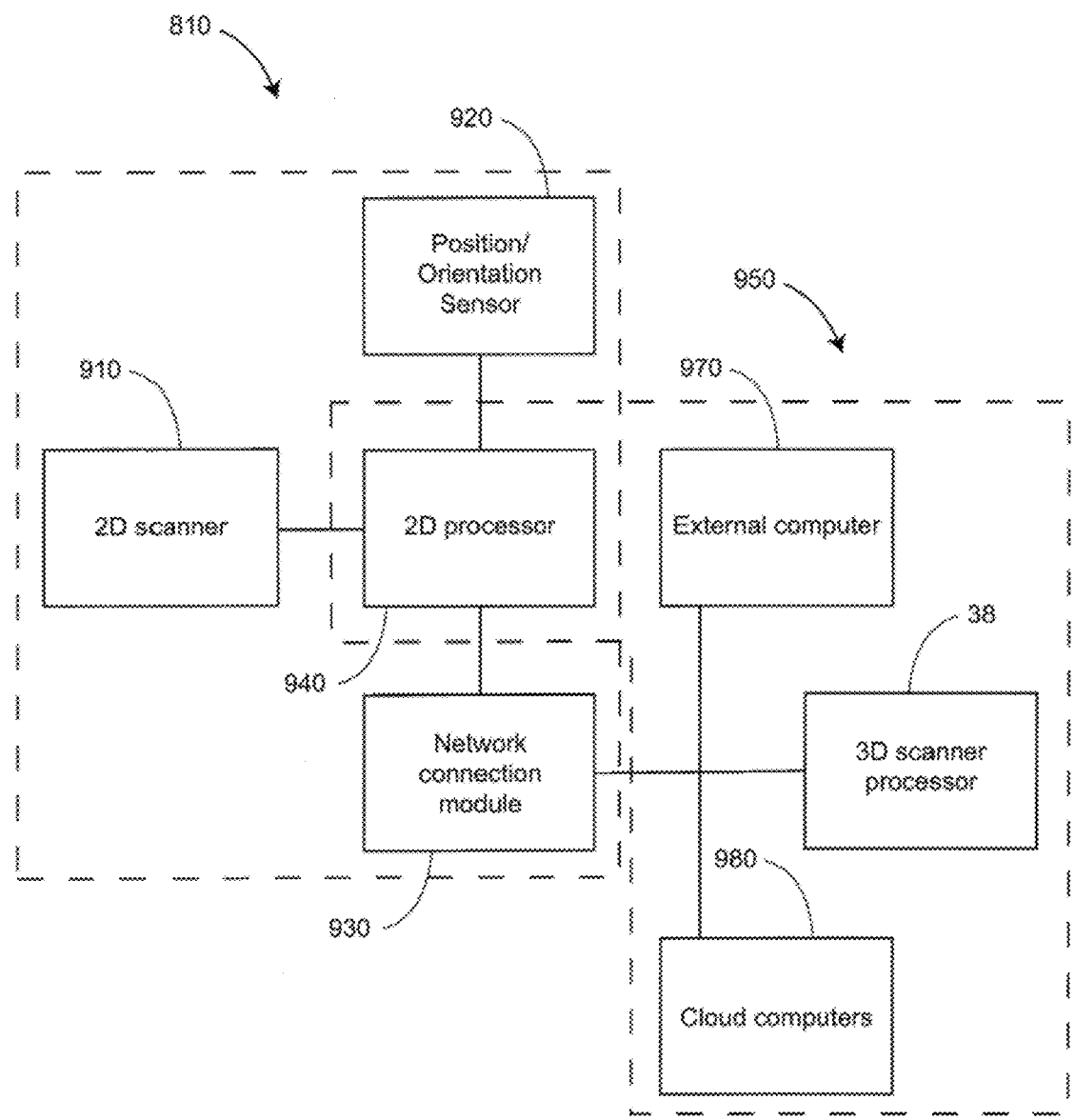
FIG. 9 is a block diagram depicting a 2D scanner accessory and a processor system according to one or more embodiments described herein.

FIGS. 8 and 9 show an embodiment of a 3D measuring device 800 that includes a 3D scanner 20, a two-dimensional (2D) scanner accessory 810, a processor system 950, and an optional moveable platform 820. The 3D measuring device 800 may be a 3D TOF scanner 20 as described in reference to FIG. 1. The 2D scanner accessory 810 includes a 2D scanner 910 and may optionally include, as shown in FIG. 9, a 2D processor 940, a position/orientation sensor 920, and a network connection module 930.

The processor system 950 includes one or more processing elements that may include a 3D scanner processor (controller) 38, 2D processor 940, an external computer 970, and a cloud computer 980. The processors may be microprocessors, field programmable gate arrays (FPGAs), digital signal processors (DSPs), and generally any device capable of performing computing functions. The one or more processors have access to memory for storing information. In an embodiment illustrated in FIG. 9, the controller 38 represents one or more processors distributed throughout the 3D scanner. Also included in the embodiment of FIG. 9 are 2D processor 940 for the 2D scanner accessory 810, an external computer 970, and one or more cloud computers 980 for remote computing capability. In another embodiment, only one or two of the processors 38, 960, 970, and 980 is provided in the processor system. Communication among the processors may be through wired links, wireless links, or a combination of wired and wireless links. In an embodiment, the connection between the processor of the 2D scanner accessory and the 3D scanner is made by IEEE 802.11 (Wi-Fi) through the network connection module 930. In an embodiment, scan results are uploaded after each scanning session to the cloud (remote network) for storage and future use.

The 2D scanner accessory 810 measures 2D coordinates in a plane. In most cases, it does this by steering light within a plane to illuminate object points in the environment. It collects the reflected (scattered) light from the object points to determine 2D coordinates of the object points in the 2D plane. In an embodiment, the 2D scanner scans a spot of light over an angle while at the same time measuring an angle value and corresponding distance value to each of the illuminated object points. It should be appreciated that in some embodiments the 2D scanner 810 may be the same as that described in commonly owned United States Patent Publication 2019/0325592 the contents of which are incorporated by reference herein. In an embodiment, the 2D scanner 810 may be removably coupled to the movable platform 820.

Examples of 2D scanners 910 that might be included in the 2D scanner accessory 810 include 2D scanners from the LMS100 product family manufactured by SICK, Inc. of Minneapolis, MN, and 2D scanner models URG-04LX-UG01 and UTM-30LX manufactured by Hokuyo Automation Co., Ltd of Osaka, Japan. The scanners in the Sick LMS100 family measure angles over a 270 degree range and over distances up to 20 meters. The Hoyuko model URG-04LX-UG01 is a low-cost 2D scanner that measures angles over a 240 degree range and distances up to 4 meters. The Hoyuko model UTM-30LX is a 2D scanner that measures angles over a 270 degree range and to distances up to 30 meters. Many other types of 2D scanners are also available.

The optional position/orientation sensor 920 in the 2D scanner accessory 810 may include inclinometers (accelerometers), gyroscopes, magnetometers, and altimeters. Usually devices that include one or more of an inclinometer and gyroscope are referred to as an inertial measurement unit (IMU). In some cases, the term IMU is used in a broader sense to include a variety of additional devices that indicate position and/or orientation—for example, magnetometers that indicate heading based on changes in magnetic field direction relative to the earth's magnetic north and altimeters that indicate altitude (height). An example of a widely used altimeter is a pressure sensor. By combining readings from a combination of position/orientation sensors with a fusion algorithm that may include a Kalman filter, relatively accurate position and orientation measurements can be obtained using relatively low-cost sensor devices.

The optional moveable platform 820 enables the 3D measuring device 800 to be moved from place to place, typically along a floor that is approximately horizontal. In an embodiment, the optional moveable platform 820 is a tripod that includes wheels 822. In an embodiment, the wheels 822 may be locked in place using wheel brakes 824. In another embodiment, the wheels 822 are retractable, enabling the tripod to sit stably on three feet attached to the tripod. In another embodiment, the tripod has no wheels but is simply pushed or pulled along a surface that is approximately horizontal, for example, a floor. In another embodiment, the optional moveable platform 820 is a wheeled cart that may be hand pushed/pulled or motorized.

In an embodiment, the 2D scanner accessory 810 is mounted between the moveable platform 820 and the 3D scanner 20 as shown in FIG. 8. In another embodiment, the 2D scanner accessory 810 is integrated into the 3D scanner 20. In another embodiment, the 2D scanner accessory 810 is mounted on the moveable platform 820, for example, on a leg of a tripod or between the legs of the tripod. In another embodiment, the 2D scanner accessory 810 is mounted on the body of the 3D scanner, for example, in a position similar to that of element 70 in FIG. 1. In another embodiment, the 2D scanner 910 is attached to a leg of a tripod while other parts of the 2D scanner accessory 810 are internal to the 3D scanner 20.

In an embodiment, the 2D scanner 910 is oriented so as to scan a beam of light over a range of angles in a horizontal plane. At instants in time the 2D scanner 910 returns an angle reading and a corresponding distance reading to provide 2D coordinates of object points in the horizontal plane. In completing one scan over the full range of angles, the 2D scanner returns a collection of paired angle and distance readings. As the 3D measuring device 800 is moved from place to place, the 2D scanner 910 continues to return 2D coordinate values. These 2D coordinate values are used to locate the position of the 3D scanner 20 at each stationary registration position, thereby enabling more accurate registration.

Figure 10:
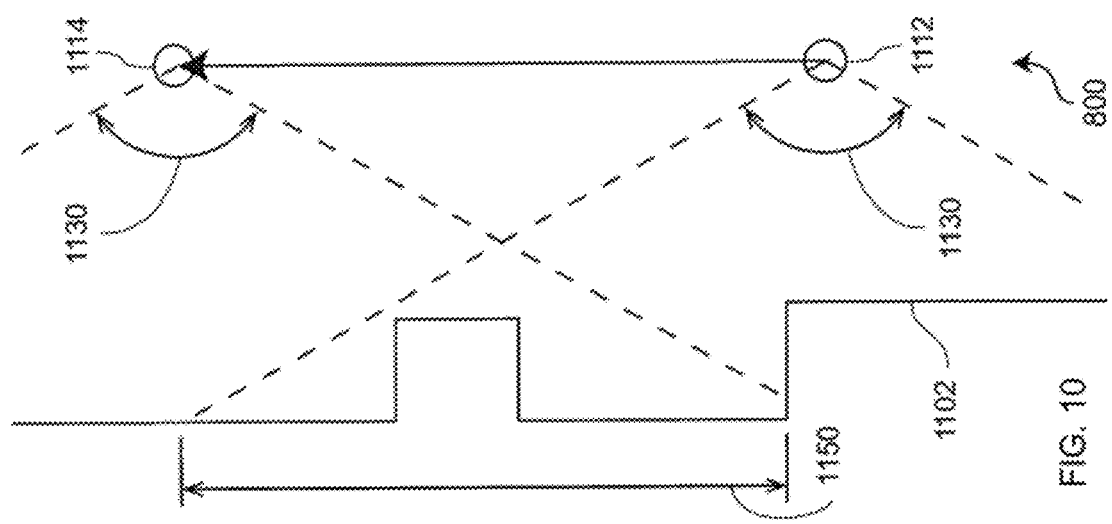
FIG. 10 is a schematic representation of a 3D scanner measuring an object from two registration positions according to one or more embodiments described herein.

FIG. 10 shows the 3D measuring device 800 moved to a first registration position 1112 in front of an object 1102 that is to be measured. The object 1102 might for example be a wall in a room. In an embodiment, the 3D measuring device 800 is brought to a stop and is held in place with brakes, which in an embodiment are brakes 824 on wheels 822. The 3D scanner 20 in the 3D measuring device 800 takes a first 3D scan of the object 1102. In an embodiment, the 3D scanner 20 may if desired obtain 3D measurements in all directions except in downward directions blocked by the structure of the 3D measuring device 800. However, in the example of FIG. 10, in which 3D scanner 20 measures a long, mostly flat structure 1102, a smaller effective FOV 1130 may be selected to provide a more face-on view of features on the structure.

When the first 3D scan is completed, the processor system 950 receives a signal indicating that 2D scan data is being collected. This signal may come from the position/orientation sensor 920 in response to the sensor 920 detecting a movement of the 3D measuring device 800. The signal may be sent when the brakes are released, or it may be sent in response to a command sent by an operator. The 2D scanner accessory 810 may start to collect data when the 3D measuring device 800 starts to move, or it may continually collect 2D scan data, even when the 2D scanner accessory 810 is stationary. In an embodiment, the 2D scanner data is sent to the processor system 950 as it is collected.

Figure 11:
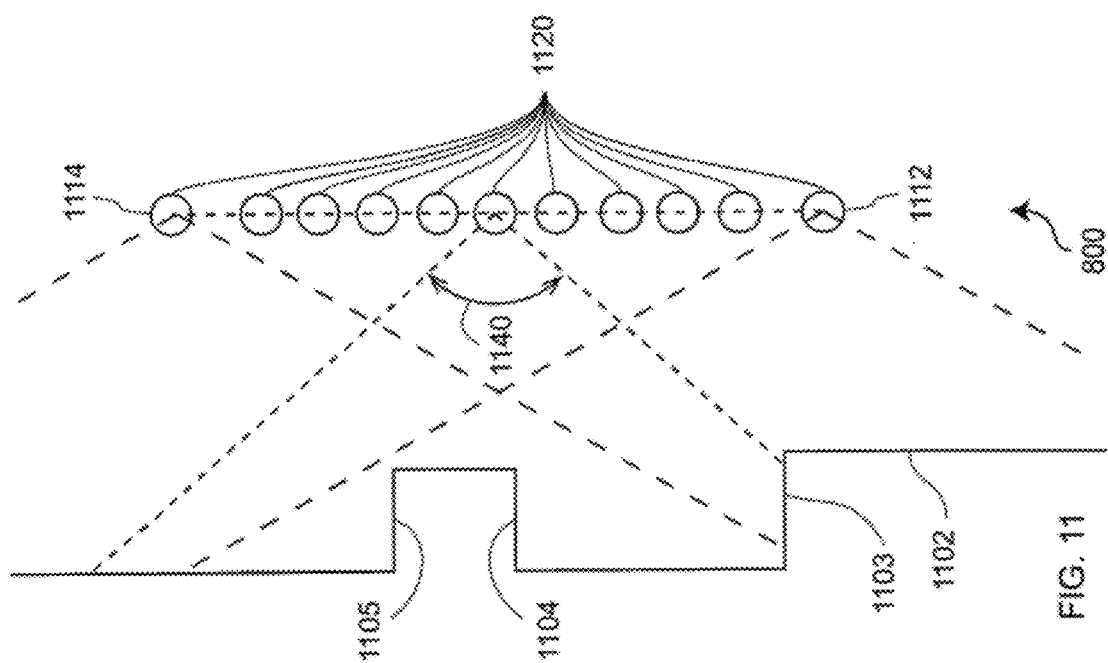
FIG. 11 is a schematic representation of a 2D scanner measuring the object from a plurality of intermediate positions according to one or more embodiments described herein.

In an embodiment, the 2D scanner accessory 810 measures as the 3D measuring device 800 is moved toward the second registration position 1114. In an embodiment, 2D scan data is collected and processed as the scanner passes through a plurality of 2D measuring positions 1120 (FIG. 11). At each measuring position 1120, the 2D scanner collects 2D coordinate data over an effective FOV 1140. Using methods described in more detail below, the processor system 950 uses 2D scan data from the plurality of 2D scans at positions 1120 to determine a position and orientation of the 3D scanner 20 at the second registration position 1114 relative to the first registration position 1112, where the first registration position and the second registration position are known in a 3D coordinate system common to both. In an embodiment, the common coordinate system is represented by 2D Cartesian coordinates x, y and by an angle of rotation θ relative to the x or y axis. In an embodiment, the x and y axes lie in the plane of the scanner and may be further based on a direction of a "front" of the 2D scanner 910. An example of such an (x, y, θ) coordinate system is the coordinate system 1410 of FIG. 14A.

On the object 1102, there is a region of overlap 1150 between the first 3D scan (collected at the first registration position 1112) and the second 3D scan (collected at the second registration position 1114). In the overlap region 1150 there are registration targets (which may be natural features of the object 1102) that are seen in both the first 3D scan and the second 3D scan. A problem that often occurs in practice is that, in moving the 3D scanner 20 from the first registration position 1112 to the second registration position 1114, the processor system 950 loses track of the position and orientation of the 3D scanner 20 and hence is unable to correctly associate the registration targets in the overlap regions to enable the registration procedure to be performed reliably. By using the succession of 2D scans, the processor system 950 is able to determine the position and orientation of the 3D scanner 20 at the second registration position 1114 relative to the first registration position 1112. This information enables the processor system 950 to correctly match registration targets in the region of overlap 1150, thereby enabling the registration procedure to be properly completed.

Figure 12:
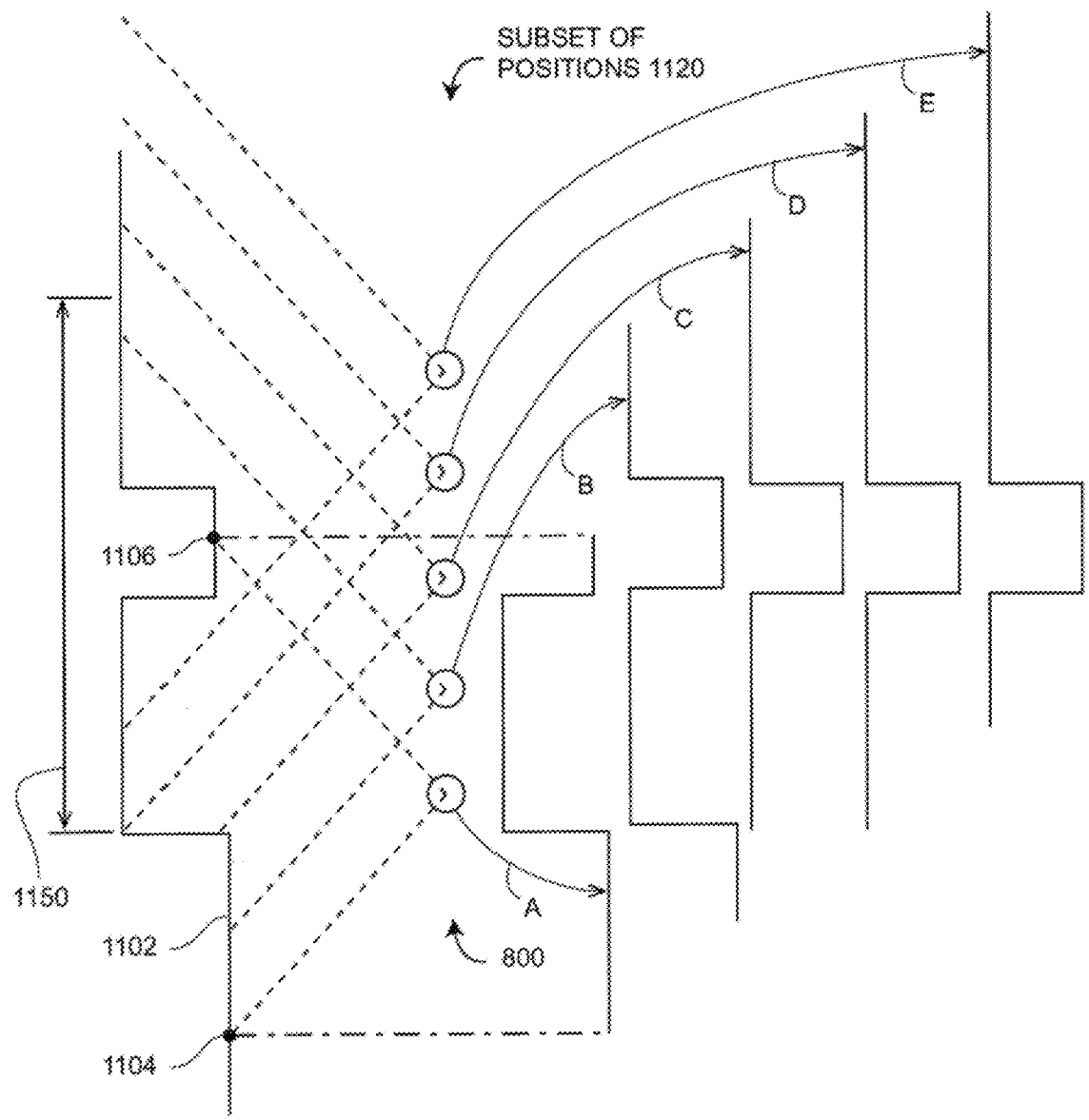
FIG. 12 depicts a 2D scanner capturing portions of the object from a plurality of positions according to one or more embodiments described herein.

FIG. 12 shows the 2D scanner 910 collecting 2D scan data at selected positions 1120 over the effective FOV 1140 (FIG. 11). At different positions 1120, the 2D scanner captures a portion of the object 1102 marked A, B, C, D, and E. FIG. 12 shows 2D scanner moving in time relative to a fixed frame of reference of the object 1102.

Figure 13:
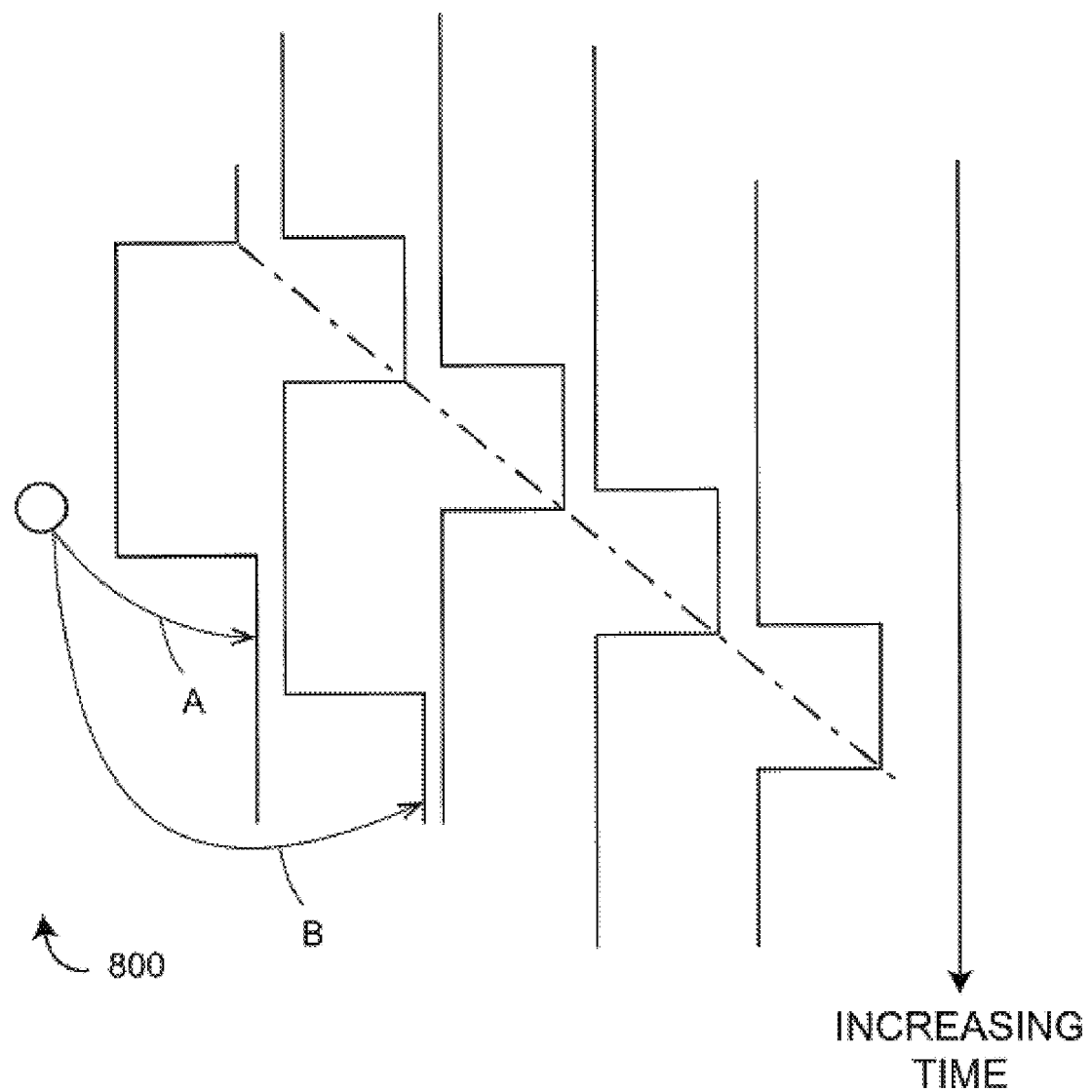
FIG. 13 depicts the 2D scanner capturing portions of the object from a plurality of positions, as seen from a frame of reference of the 2D scanner, according to one or more embodiments described herein.

FIG. 13 includes the same information as FIG. 12 but shows it from the frame of reference of the 2D scanner 910 rather than the frame of reference of the object 1102. This figure makes clear that in the 2D scanner frame of reference, the position of features on the object change over time. Hence it is clear that the distance traveled by the 2D scanner 910 can be determined from the 2D scan data sent from the 2D scanner accessory 810 to the processor system 950.

Figure 14A:
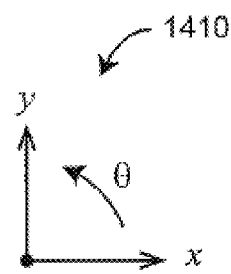
FIGS. 14A, 14B, and 14C depict a method for finding changes in the position and orientation of the 2D scanner over time according to one or more embodiments described herein.
Figure 14B:
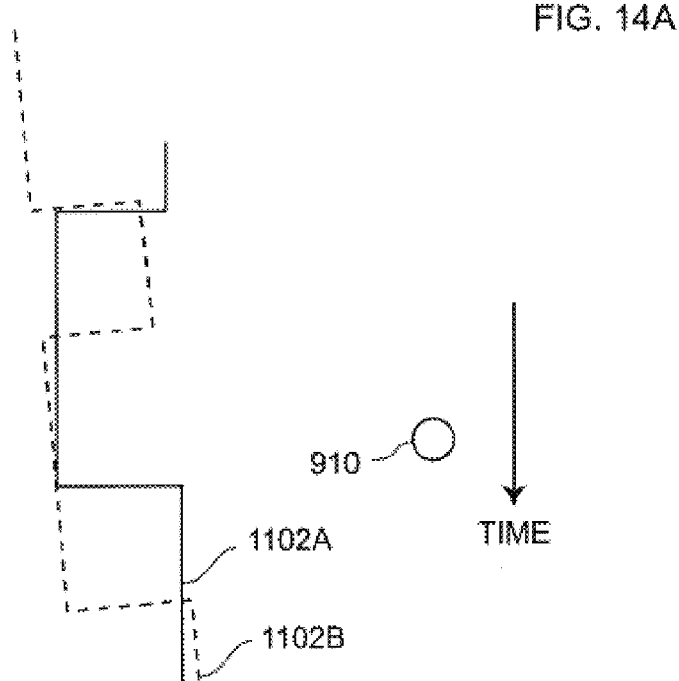
Figure 14C:
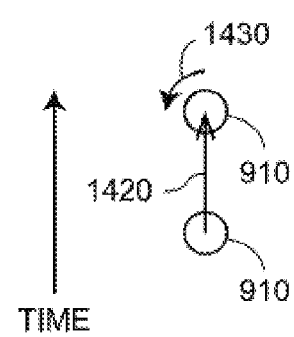

FIG. 14A shows a coordinate system 1410 that may be used in FIGS. 14B and 14C. In an embodiment, the 2D coordinates x and y are selected to lie on the plane of the 2D scanner 910. The angle θ is selected as a rotation angle relative to an axis such as x or y. FIGS. 14B, 14C represent a realistic case in which the 2D scanner 910 is moved not exactly on a straight line, for example, nominally parallel to the object 1102, but also to the side. Furthermore, the 2D scanner 910 may be rotated as it is moved.

FIG. 14B shows the movement of the object 1102 as seen from the frame of reference of the 2D scanner 910. In the 2D scanner frame of reference (that is, as seen from the 2D scanner's point of view), the object 1102 is moving while the 2D scanner 910 is fixed in place. In this frame of reference, the portions of the object 1102 seen by the 2D scanner 910 appear to translate and rotate in time. The 2D scanner accessory 810 provides a succession of such translated and rotated 2D scans to the processor system 950. In the example shown in FIGS. 14A, 14B, the scanner translates in the +y direction by a distance 1420 shown in FIG. 14C and rotates by an angle 1430, which in this example is +5 degrees. Of course, the scanner 910 could equally well have moved in the +x or −x direction by a small amount. To determine the movement of the 2D scanner 910 in the x, y, θ directions, the processor system 950 uses the data recorded in successive scans as seen in the frame of reference of the 2D scanner 910, as shown in FIG. 14B. In an embodiment, the processor system 950 performs a best-fit calculation using methods well known in the art to match the two scans or features in the two scans as closely as possible.

As the 2D scanner 910 takes successive 2D readings and performs best-fit calculations, the processor system 950 keeps track of the translation and rotation of the 2D scanner, which is the same as the translation and rotation of the 3D scanner 20 and the measuring device 800. In this way, the processor system 950 is able to accurately determine the change in the values of x, y, θ as the measuring device 800 moves from the first registration position 1112 to the second registration position 1114.

It should be appreciated that the processor system 950 determines the position and orientation of the 3D measuring device 800 based on a comparison of the succession of 2D scans and not on fusion of the 2D scan data with 3D scan data provided by the 3D scanner 20 at the first registration position 1112 or the second registration position 1114 (FIG. 10).

Instead, the processor system 950 is configured to determine a first translation value, a second translation value, and a first rotation value that, when applied to a combination of the first 2D scan data and second 2D scan data, results in transformed first 2D data that matches transformed second 2D data closely according to an objective mathematical criterion. In general, the translation and rotation may be applied to the first scan data, the second scan data, or to a combination of the two. For example, a translation applied to the first data set is equivalent to a negative of the translation applied to the second data set in the sense that both actions produce the same match in the transformed data sets. An example of an "objective mathematical criterion" is that of minimizing the sum of squared residual errors for those portions of the scan data judged to overlap. Another type of objective mathematical criterion may involve a matching of multiple features identified on the object. For example, such features might be the edge transitions 1103, 1104, and 1105 shown in FIG. 11B. The mathematical criterion may involve processing of the raw data provided by the 2D scanner accessory 810 to the processor system 950, or it may involve a first intermediate level of processing in which features are represented as a collection of line segments using methods that are known in the art, for example, methods based on the Iterative Closest Point (ICP). Such a method based on ICP is described in Censi, A., "An ICP variant using a point-to-line metric," IEEE International Conference on Robotics and Automation (ICRA) 2008.

In an embodiment, the first translation value is dx, the second translation value is dy, and the first rotation value dθ. If the first scan data is collected with the 2D scanner 910 having translational and rotational coordinates (in a reference coordinate system) of $(x_1, y_1, \theta_1)$, then when the second 2D scan data is collected at a second location the coordinates are given by $(x_2, y_2, \theta_2)=(x_1+dx, y_1+dy, \theta_1+d\theta)$. In an embodiment, the processor system 950 is further configured to determine a third translation value (for example, dz) and a second and third rotation values (for example, pitch and roll). The third translation value, second rotation value, and third rotation value may be determined based at least in part on readings from the position/orientation sensor 920.

The 2D scanner 910 collects 2D scan data at the first registration position 1112 and more 2D scan data at the second registration position 1114. In some cases, these scans may suffice to determine the position and orientation of the 3D measuring device at the second registration position 1114 relative to the first registration position 1112. In other cases, the two sets of 2D scan data are not sufficient to enable the processor system 950 to accurately determine the first translation value, the second translation value, and the first rotation value. This problem may be avoided by collecting 2D scan data at intermediate scan locations 1120. In an embodiment, the 2D scan data is collected and processed at regular intervals, for example, once per second. In this way, features are easily identified in successive 2D scans. If more than two 2D scans are obtained, the processor system 950 may choose to use the information from all the successive 2D scans in determining the translation and rotation values in moving from the first registration position 1112 to the second registration position 1114. In another embodiment, the processor may choose to use only the first and last scans in the final calculation, simply using the intermediate 2D scans to ensure proper correspondence of matching features. In most cases, accuracy of matching is improved by incorporating information from multiple successive 2D scans.

The first translation value, the second translation value, and the first rotation value are the same for the 2D scanner, the 3D scanner, and the 3D measuring device since all are rigidly held relative to the others.

The 3D measuring device 800 is moved to the second registration position 1114. In an embodiment, the 3D measuring device 800 is brought to a stop and brakes are locked to hold the 3D scanner stationary. In another embodiment, the processor system 950 starts the 3D scan automatically when the moveable platform is brought to a stop, for example, by the position/orientation sensor 920 noting the lack of movement. The 3D scanner 20 in the 3D measuring device 800 takes a 3D scan of the object 1102. This 3D scan is referred to as the second 3D scan to distinguish it from the first 3D scan taken at the first registration position.

The processor system 950 applies the already calculated first translation value, the second translation value, and the first rotation value to adjust the position and orientation of the second 3D scan relative to the first 3D scan. This adjustment, which may be considered to provide a "first alignment," brings the registration targets (which may be natural features in the overlap region 1150) into close proximity. The processor system 950 performs a fine registration in which it makes fine adjustments to the six degrees of freedom of the second 3D scan relative to the first 3D scan. It makes the fine adjustment based on an objective mathematical criterion, which may be the same as or different than the mathematical criterion applied to the 2D scan data. For example, the objective mathematical criterion may be that of minimizing the sum of squared residual errors for those portions of the scan data judged to overlap. In another embodiment, the objective mathematical criterion may be applied to a plurality of features in the overlap region. The mathematical calculations in the registration may be applied to raw 3D scan data or to geometrical representations of the 3D scan data, for example, by a collection of line segments.

Outside the overlap region 1150, the aligned values of the first 3D scan and the second 3D scan are combined in a registered 3D data set. Inside the overlap region, the 3D scan values included in the registered 3D data set are based on some combination of 3D scanner data from the aligned values of the first 3D scan and the second 3D scan.

Figure 15A:
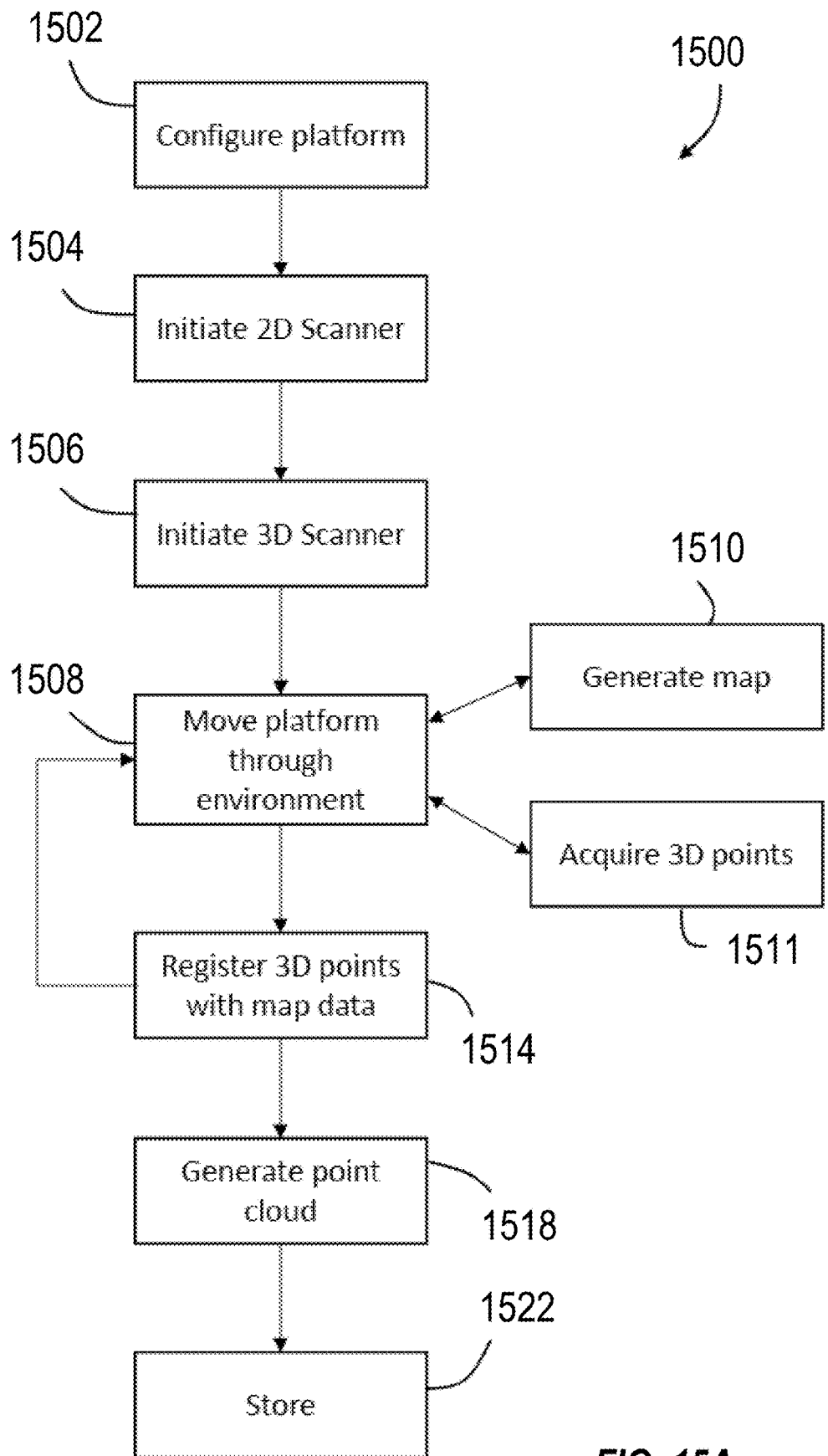
FIG. 15A is a flow diagram of a method of scanning an environment using the 3D measuring device of FIG. 8 and the 2D scanner accessory and processor system of FIG. 9 according to one or more embodiments described herein.

FIG. 15A is a flow diagram of a method of scanning an environment using the 3D measuring device of FIG. 8, which includes the 2D scanner accessory and processor system of FIG. 9 according to one or more embodiments described herein. In particular, FIG. 15A depicts an embodiment of a method 1500 for scanning an environment, for example, with the 3D measuring device 800. The method 1500 starts in block 1502 where the platform is configured. In the embodiment where the platform is the 3D measuring device 800, the configuring may include attaching the 2D scanner accessory 810 and/or the 3D TOF scanner 20 to the moveable platform 820. In some examples, the configuring may include determining a path for the 3D measuring device 800 to follow and defining stationary scan locations (if desired). In an embodiment, the path may be determined using the system and method described in commonly owned U.S. patent application Ser. No. 16/154,240, the contents of which are incorporated by reference herein. In examples, once the path is defined, the 2D scanner accessory 810 and the 3D TOF scanner 20 may be coupled to the moveable platform 20. It should be appreciated that in some embodiments, the 3D measuring device 800 may be remotely controlled by an operator and the step of defining a path may not be performed.

Once the 3D measuring device 800 is configured, the method 1500 proceeds to block 1504 where the 2D scanner 910 is initiated and the 3D TOF scanner 20 is initiated in block 1506. It should be appreciated that when operation of the 2D scanner 910 is initiated, the 2D scanner 910 starts to generate a 2D map of the environment as described herein. Similarly, when operation of the 3D TOF scanner 20 is initiated, the coordinates of 3D points in the environment are acquired in a volume about the 3D scanner.

Figure 15B:
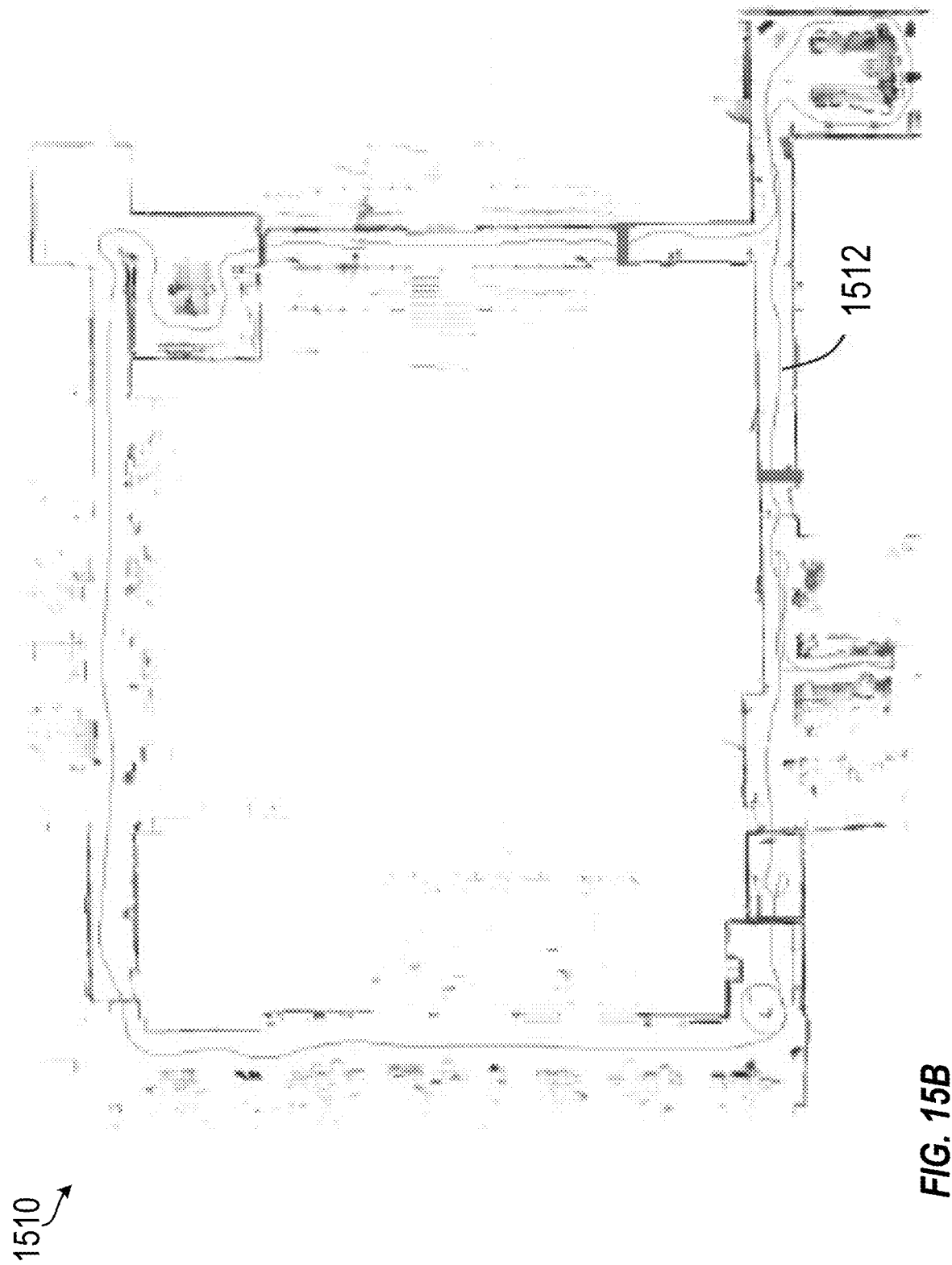
FIG. 15B is a plan view of a 2D map generated during the method of FIG. 15A according to one or more embodiments described herein.

The method 1500 then proceeds to block 1508 where the 3D measuring device 800 is moved through the environment. As the 3D measuring device 800 is moved, both the 2D scanner 910 and the 3D TOF scanner 20 continue to operate. This results in the generation of both a 2D map 1510 (FIG. 15B) and the acquisition of 3D points 1511. In an embodiment, as the 2D map is generated, the location or path 1512 of the 3D measuring device is indicated on the 2D map 1510. In an embodiment, the 3D measuring device 800 may include a user interface that provides feedback to the operator during the performing of the scan. In an embodiment, a quality attribute (e.g., scan density) of the scanning process may be determined during the scan. When the quality attribute crosses a threshold (e.g. scan density too low), the user interface may provide feedback to the operator. In an embodiment, the feedback is for the operator to perform a stationary scan with the 3D scanner.

The method 1500 then proceeds to block 1514 where the acquired 3D coordinate points are registered into a common frame of reference. It should be appreciated that since the 3D measurement device 800 is moving while the 3D measurement device 800 is acquiring data, the local frame of reference of the 3D TOF scanner 20 is also changing. Using the position and pose data from the 2D scanner 910, the frame of reference of the acquired 3D coordinate points may be registered into a global frame of reference. In an embodiment, the registration is performed as the 3D measurement device 800 is moved through the environment. In another embodiment, the registration is done when the scanning of the environment is completed.

Figure 15C:
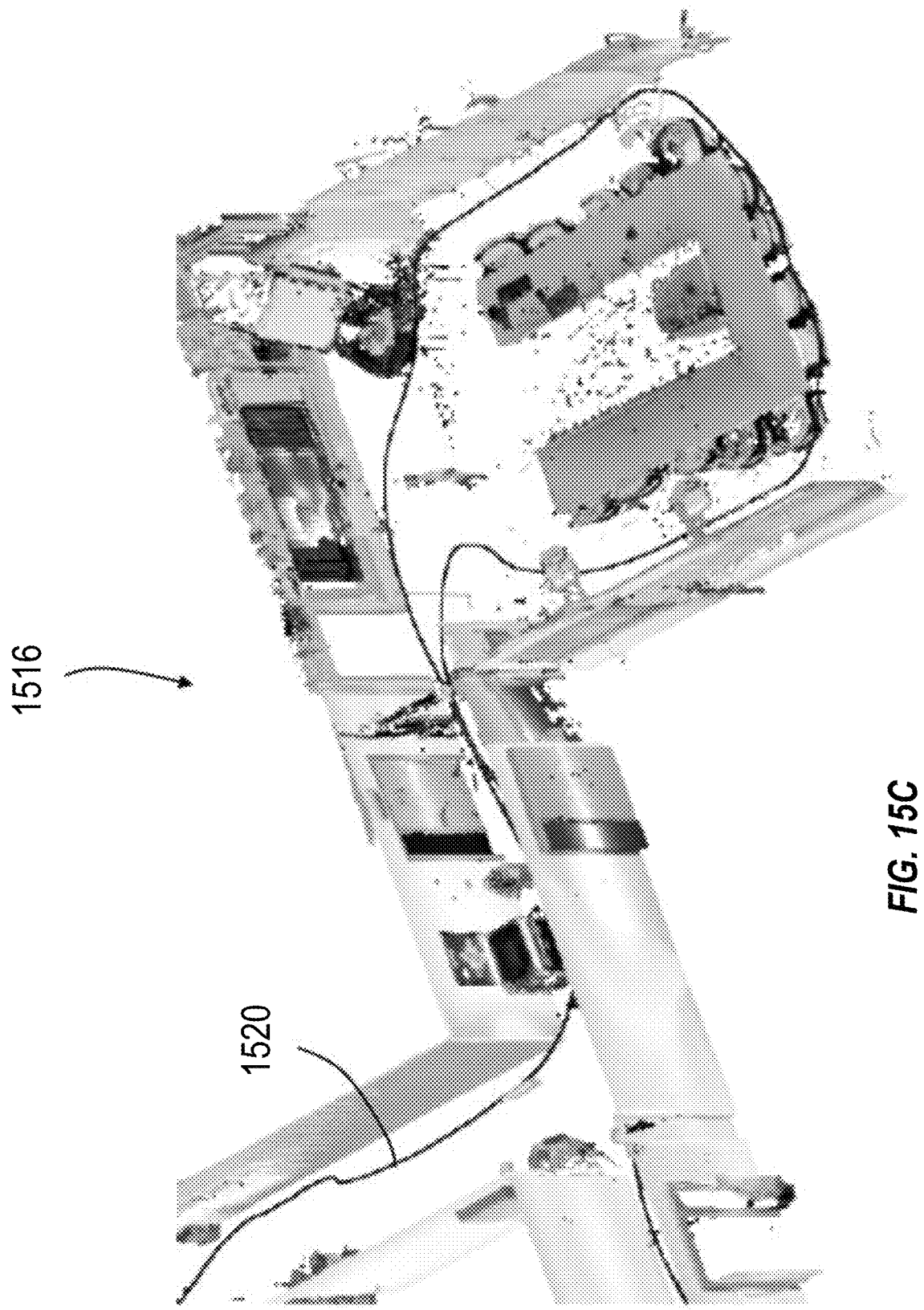
FIG. 15C is a point cloud image of a portion of the environment acquired using the method of FIG. 15A according to one or more embodiments described herein.

The registration of the 3D coordinate points allows the generation of a point cloud 1516 (FIG. 15C) in block 1518. In an embodiment, a representation of the path 1520 of the 3D measurement device 800 is shown in the point cloud 1516. In some embodiments, the point cloud 1516 is generated and displayed to the user as the 3D measurement device 800 moves through the environment being scanned. In these embodiments, blocks 1508, 1514, 1518 may loop continuously until the scanning is completed. With the scan complete, the method 1500 ends in block 1522 where the point cloud 1516 and 2D map 1510 are stored in memory of a controller or processor system.

Technical effects and benefits of some embodiments include providing a system and a method that facilitate the rapid scanning of an environment using a movable platform that simultaneously generates a 2D map of the environment and a point cloud.

Figure 16A:
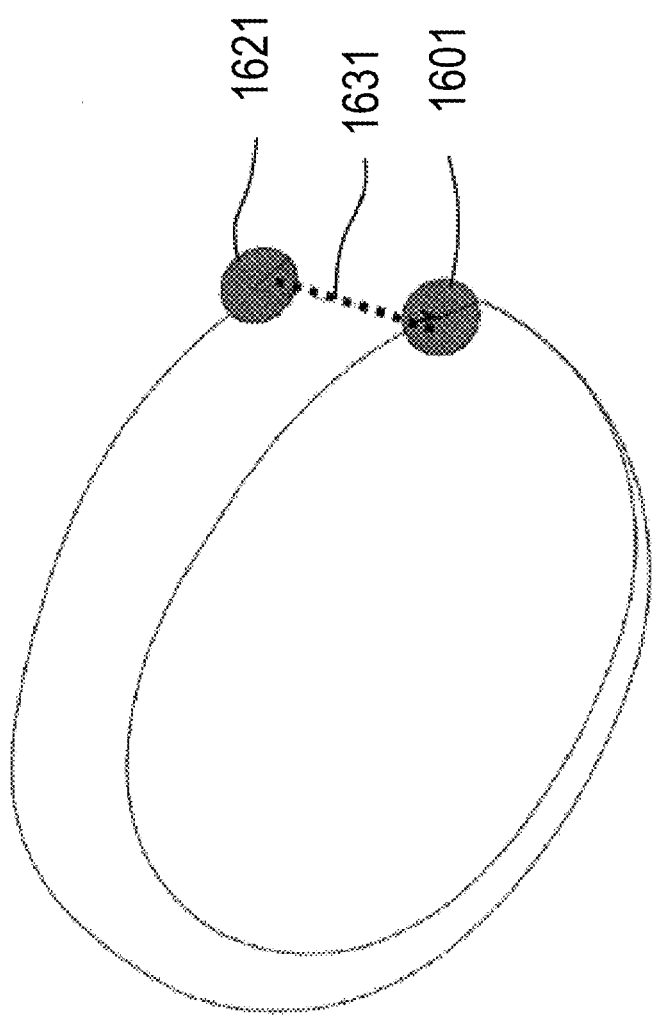
FIG. 16A schematically depicts an example scenario in which an offset is continuously introduced in estimated scan position coordinates according to one or more embodiments described herein.

Because of the variance in the 2D laser measurement data, an offset, sometimes referred to as "drift", may be continuously added to the measurement, which is typically removed using loop closure algorithms. FIG. 16A schematically illustrates an example scenario in which an offset is continuously introduced. Consider that the 3D measuring device 800 (its movement is tracked by the 2D scanner 910 as described above) is moving from a starting position 1601 (real pose). After some movements the 3D measuring device 800 is designated to return to an already mapped region, such as the starting position 1601, however the measured position due to sensor variation and the subsequent measurement error is a different position 1621 (estimated pose). The loop closure algorithm(s) that are typically used detects the loop closure correction 1631 and corrects the pose and the maps that have been acquired so far by the 3D measuring device 800. As a consequence all positions in the map, including the scan positions, the registration points, and the points scanned and stored in the 2D scans and 3D scans, change their coordinates based on the loop closure correction 1631. In a pure mapping application this may not introduce inefficiencies or other issues; however, for the 3D measuring device 800 that uses scans from different scan positions, such a change in map coordinates leads to errors/inefficiencies because the scan positions are recorded before they are not automatically adapted in this manner.

Figure 16B:
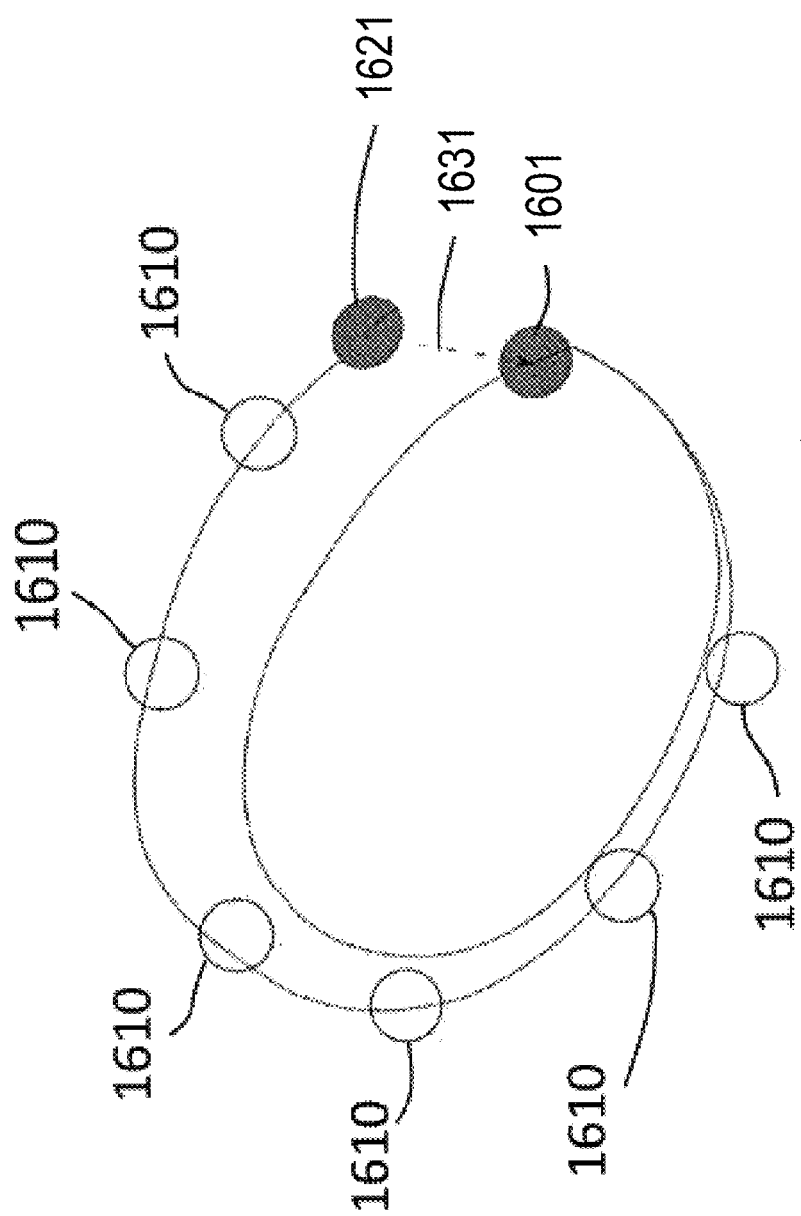
FIG. 16B illustrates accumulation of errors and inefficiencies when using estimated scan positions for capturing 3D scans of an environment according to one or more embodiments described herein.

For example, FIG. 16B illustrates the accumulation of errors and inefficiencies. The 3D measuring device 800 starts moving from the start position 1601. After some movement the 3D measuring device 800 takes a 3D scan as described herein from one of a plurality of scan positions 1610. When the 3D measuring device 800 arrives back in the start position 1601 the measurement error due to sensor data variance causes the estimated pose 1621 to differ from the start position 1601. As described herein the positions of the 3D scans are calculated from the 2D mapping. Accordingly, after loop closure the recorded 3D scan positions still have the same coordinates including the error while the map was corrected by the loop closure algorithm. Consequently the estimated positions of the 3D scans have a deviation. As described earlier, when the loop closure is now applied all positions in the map change. But as the scan positions 1610 have been recorded before they are not automatically adapted. As a consequence, there are offsets between the scan positions 1610 and the map acquired by the 3D measuring device 800. Further, by using a registration process (such as Cloud2Cloud registration for example) for the 3D scans the errors in the scan positions 1610 can be corrected in the 3D data. However, such registration process requires additional processing power and time.

The technical solutions described herein overcome such errors and inefficiencies by using the scan positions calculated from the 2D mapping directly as positions for the 3D scans, thus eliminating the registration process for the 3D scans. The technical solutions described herein facilitate an improvement to acquiring of the 3D scans by the 3D measuring device 800 by computing an additional displacement for a part of the map that is shifted by the loop closure.

Figure 17:
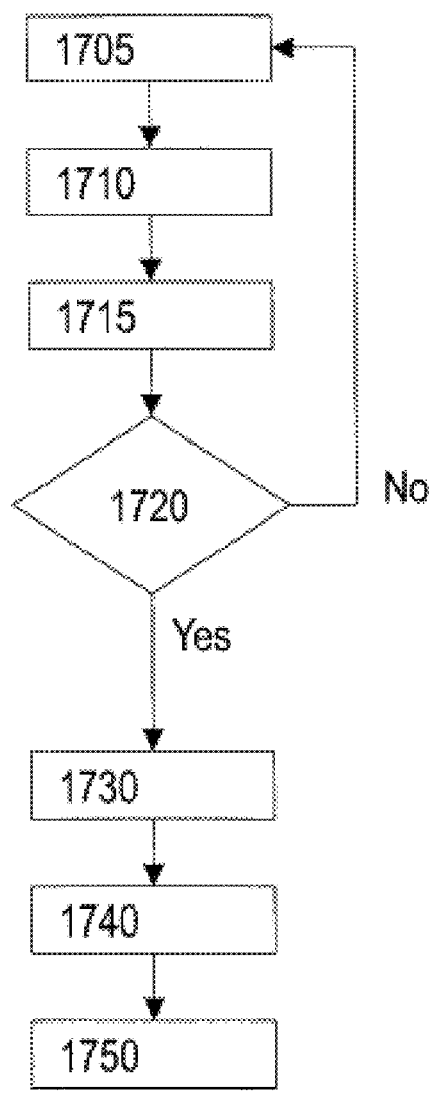
FIG. 17 illustrates a flowchart of an example method for correcting scan positions after loop closure according to one or more embodiments described herein.

FIG. 17 illustrates a flowchart of an example method for correcting the scan positions after loop closure. In one or more examples, a user stops and starts to record a 3D scan with the 3D measuring device 800 at a scan position from the scan positions 1610 (FIG. 16B). In another embodiment, the 3D measuring device 800 automatically stops and starts to record a 3D scan at the scan position. The 3D measuring device 800 initiates acquiring a 3D scan at the scan position, as shown at block 1705. Acquiring the 3D scan includes determining with processor system, in cooperation with the 3D scanner, 3D coordinates of a first collection of points on an object surface while the 3D scanner is fixedly located at a first registration position (e.g., position 1601). Further, acquiring the 3D scan includes obtaining by the 2D scanner in cooperation with the processor system a plurality of 2D scan sets. Each of the plurality of 2D scan sets is a set of 2D coordinates of points on the object surface collected as the 2D scanner moves from the first registration position to a second registration position (e.g., position 1610A). Each of the plurality of 2D scan sets is collected by the 2D scanner at a different position relative to the first registration position. The plurality of the 2D scan sets are together referred to as the 2D map and each of the scan sets is a part of the 2D map.

In one or more examples, the 2D scanner accessory 810 receives a signal from the 3D scanner 20 when the 3D scanner 20 begins acquiring the 3D scan, as shown at block 1710. The 2D scanner accessory 810 saves the current position (a 2D position of the 3D measuring device 800 in the 2D map), as shown at block 1715. In one or more examples, the 2D scanner accessory 810 saves the current position in a data structure such as a list of positions. Every position in the data structure is directly linked to the data structure of the map where the corresponding part of the map is saved. The procedure is repeated for every 3D scan executed by the 3D measuring device 800. For example, if the 3D measuring device captures n scans the data structure holds n positions with n links to the corresponding data structure that saves the map data of the map part.

If a loop closure operation is executed on the 2D map, parts of the map will be corrected in order to match the real pose, which is the starting position 1601, with the estimated pose, which is the different position 1621, as shown at blocks 1720. The loop closure algorithm calculates a displacement for each part of the 2D map that is shifted by the algorithm, as shown at block 1730. Using the data structure, the 3D measuring device 800 determines the scan positions 1610 linked to each of the 2D map parts, as shown at block 1740. In one or more examples, the lookup costs a single processor operation, such as an array lookup. The 3D measuring device 800 applies the displacement vector for a 2D map parts to the corresponding scan positions saved in the data structure and saves the resulting displaced (or revised) scan positions back into the data structure, as shown at block 1750. The 3D measuring device 800 computes displaced scan positions for each of the saved scan positions 1610 in the data structure. The procedure can be repeated every time the loop closure algorithm is applied.

Figure 18:
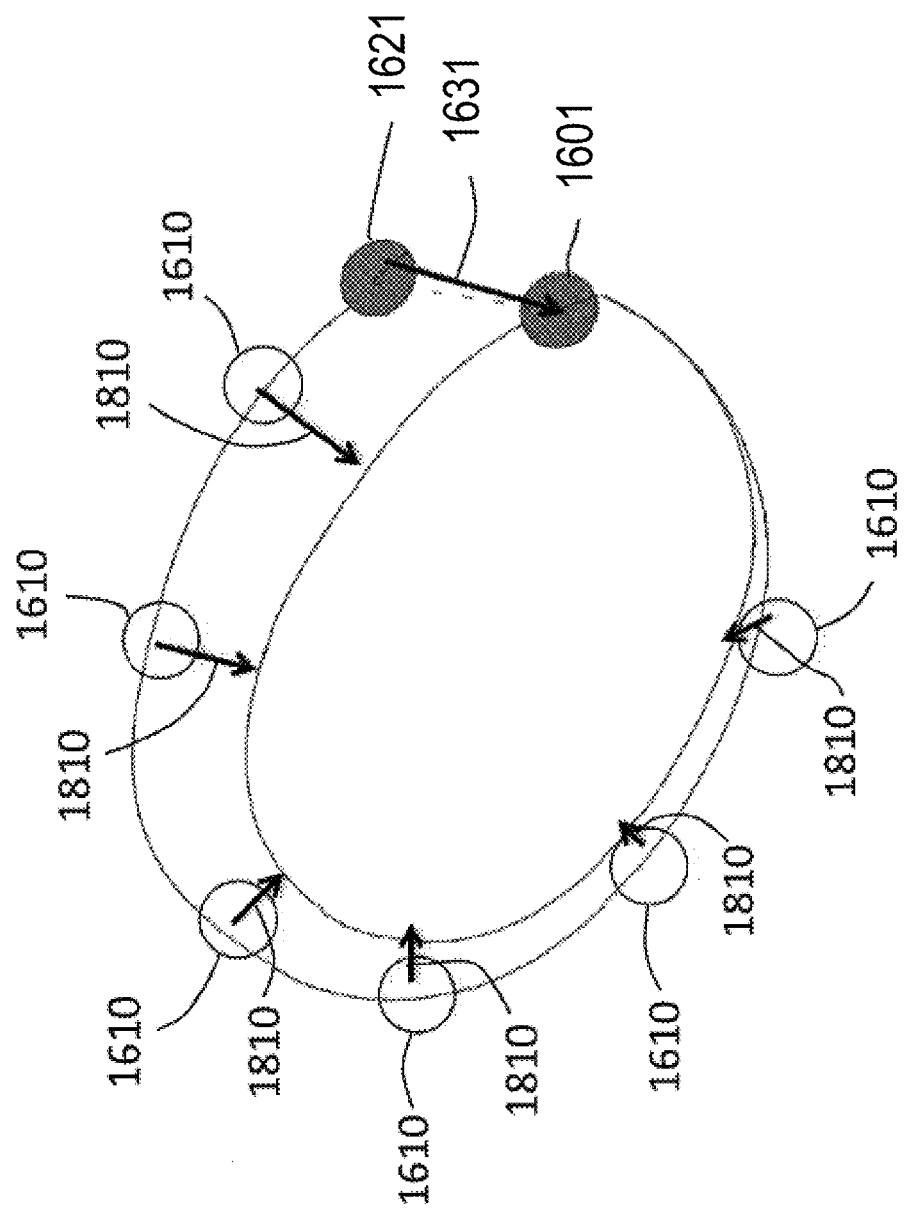
FIG. 18 depicts displacement vectors for 2D map parts that are determined based on the loop closure operation according to one or more embodiments described herein.
Figure 19:
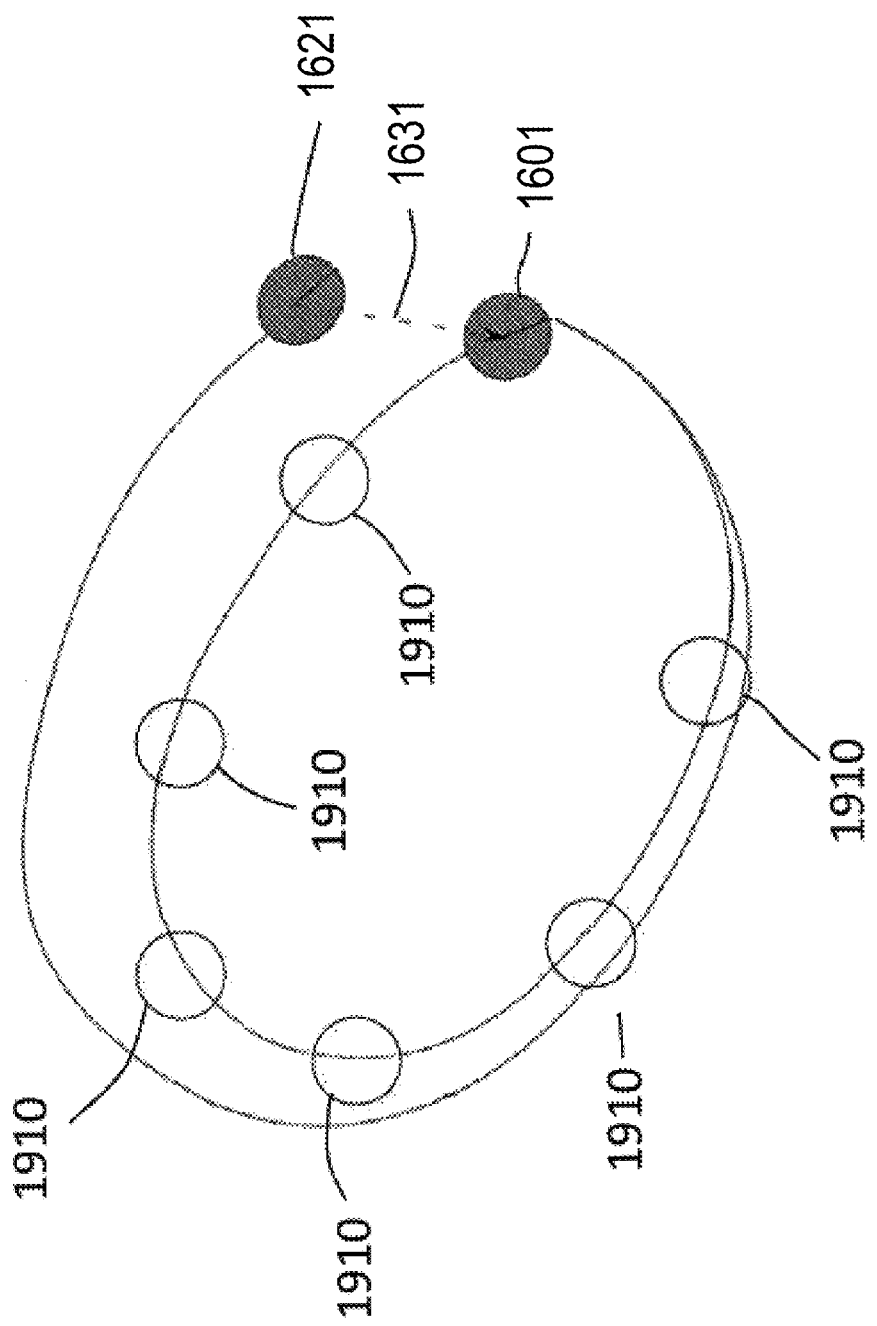
FIG. 19 depicts displaced scan positions associated with 2D map parts according to one or more embodiments described herein.

The displaced scan positions represent corrected scan positions of the 3D scans that can be used directly without applying further computational expensive 3D point cloud registration algorithms. The accuracy of the scan positions 1610 depends on the sensor accuracy of the 2D scanner 910 in the 2D scanner accessory 810. FIGS. 18 and 19 depict the displacement vectors 1810 for the 2D map parts that are determined based on the loop closure operation. The 3D measuring device 800 applies the displacement vectors 1810 to the scan positions 1610 linked to the 2D map parts by the data structure as described herein. FIG. 19 illustrates the resulting displaced scan positions 1910 based on applying the displacement vectors 1810 to the scan positions 1610. The displaced scan positions 1910 are correctly located.

Loop closure is the problem of recognizing a previously visited location and updating the map accordingly. This can be a problem because model or algorithm errors can assign low priors to the location. Conventional loop closure techniques apply a second algorithm to compute some type of sensor measure similarity and re-set the location priors when a match is detected.

Applying conventional loop closure techniques in a live mapping system which records complementary data can be problematic. For instance, when a position of an object (e.g., a pano photograph, a photograph etc.) is recorded, the system saves the current position. After the user moves forward and the loop closure algorithm begins, the complete trajectory is updated. Consequently, the previously recorded positions might not be correct anymore as the whole geometry of the environment has slightly changed. That is, conventional approaches to loop closure introduce incorrect complementary data positions.

The embodiments described herein address these shortcomings of conventional loop closure techniques by utilizing submap positions to store subject positions instead of using the global position of a trajectory. A submap represents portions of a complete map. That is, a complete map is divided into smaller submaps according to some constraints (e.g., a number of laser scans included). Submaps and the geometrically position of sub maps to each other are updated only when necessary such that the final map is the rasterization of the collective submaps for a complete map.

A complete map consists of n submaps. Each submaps has a position anchor in the absolute coordinate system. The content of a submap does not change during loop closure. Rather, loop closure adapts the position anchor of the submaps and thus the absolute position of the submaps. As a result, position anchors saved in an absolute coordinate will not be correct anymore if the absolute position of the submap changes.

Figure 20:
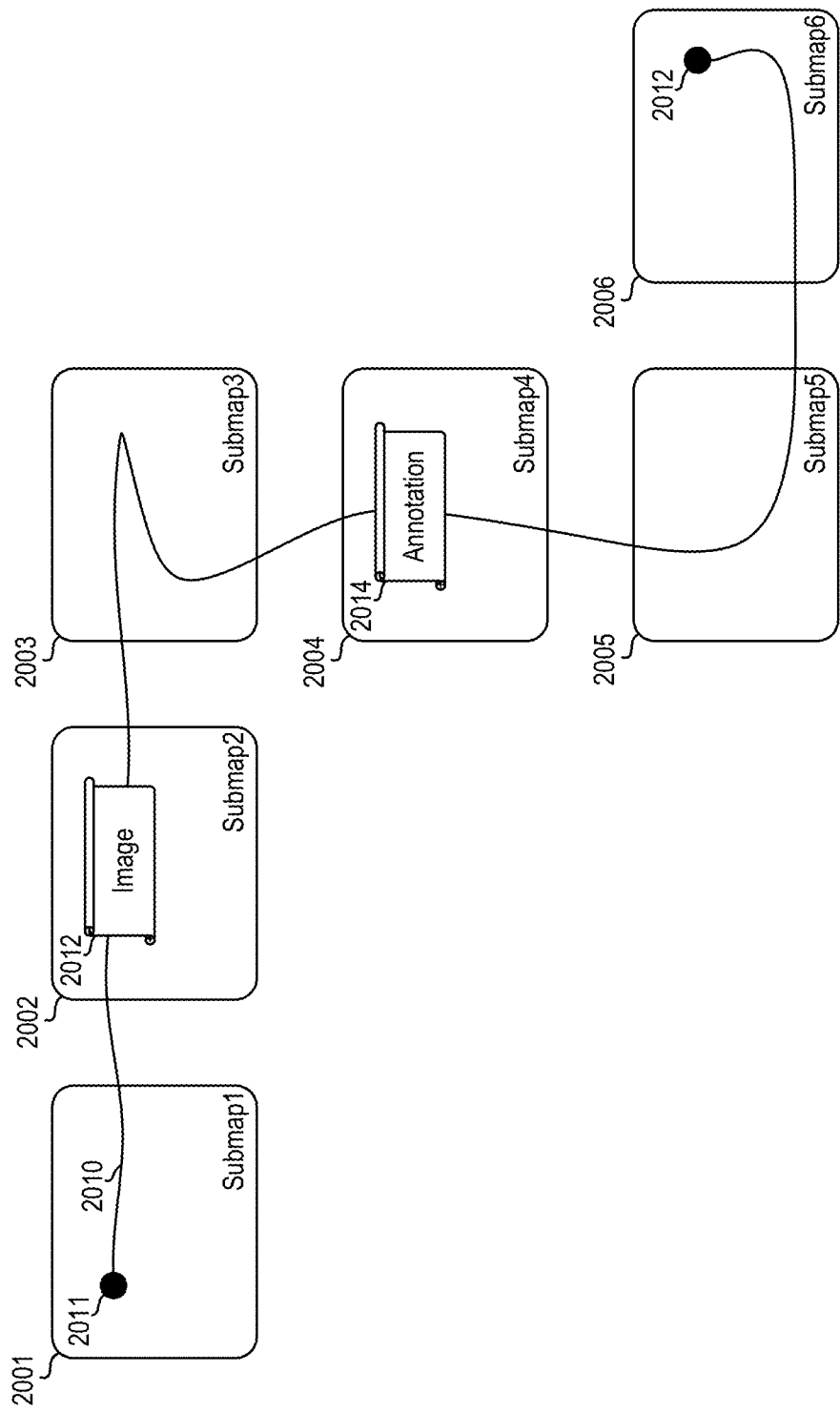
FIG. 20 depicts a mapping approach that creates multiple submaps for environment representation according to one or more embodiments described herein.

FIG. 20 depicts a mapping approach that creates multiple submaps for environment representation according to one or more embodiments described herein. The multiple submaps include Submap1 2001, Submap2 2002, Submap3 2003, Submap4 2004, Submap5 2005, Submap 6 2006 as shown. Each of the Submaps 2001-2006 has an origin (also referred to as an "anchor" or "position anchor") associated therewith that based on a 2D map created by the 2D scanner (see, e.g., the 2D map 1510 of FIG. 15B). Data associated with the 2D map is used to register the Submaps 2001-2006 to one another. In this way, each of the Submaps 2001-2006 is a grouping of data in small batches. It should be appreciated that the position anchor can change as described herein. Additionally, the size of one or more of the Submaps 2001-2006 can change depending on the environment. As an example, collectively the Submaps 2001-2006 can include 170 messages/annotations and 720 points.

A path 2010 (e.g., the path 1512 of FIG. 15B) of the scanner begins at starting position 2011 (e.g., the starting position 1601 of FIGS. 16A, 16B) and continues to end position 2012 (e.g., the different position 1621 of FIGS. 16A, 16B). Along the path 2010, images can be captured such as the image 2012 in the Submap2 2002, and annotations (or messages) can be included, such as the annotation 2014 in the Submap4 2004. The fact that the environment is divided into submaps enables the global loop closure technique to adapt and change the recorded map and thus trajectory at any time.

Figure 21:
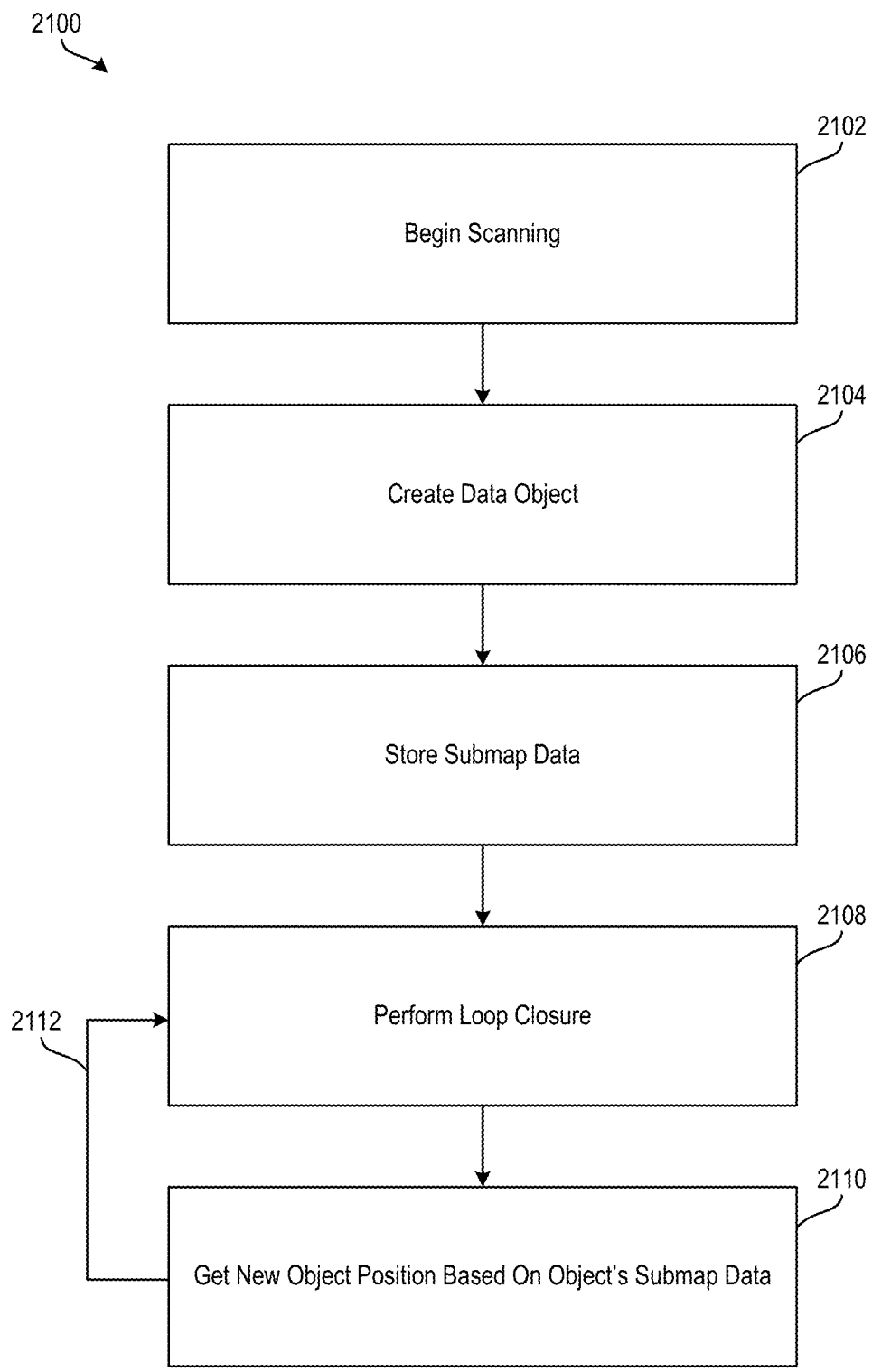
FIG. 21 depicts a method 2100 for correcting positions after loop closure in simultaneous localization and mapping algorithm (SLAM) according to one or more embodiments described herein.

FIG. 21 depicts a method 2100 for correcting positions after loop closure in simultaneous localization and mapping algorithm according to one or more embodiments described herein. The method 2100 begins at block 2102 by beginning a scanning operation as described herein using, for example, the 3D measuring device 800. At block 2104, a data object is created. It should be appreciated that a "data object" as described herein refers an object as understood in the context of object-oriented programming, namely a self-contained entity that includes data (sometimes referred to as attributes or properties) and functions/procedures/methods to manipulate the data. The data object is created during a scanning process as described herein. The data object stores coordinates (e.g., X, Y, Z coordinates) and orientation/pose information as well as timestamp information.

When a new data object is created at block 2104, it is associated with a particular submap (e.g., one of the Submaps 2001-2006 of FIG. 20). Accordingly, each of the Submaps 2001-2006 has a data object created and associated therewith at block 2104. Submap data associated with the data object is stored, at block 2106, into the data object created at block 2104. The associated data includes, for example, an identifier of the submap (i.e., "submap id") to which the data object belongs, a time stamp, and the relative position information of the data object relative to the origin (position anchor) of the submap. The data can be stored for both the 2D and 3D scans as pixels and voxels respectively, which are synchronized (linked) before storing. The synchronizing (linking) can be performed in real-time and offline using timestamps and feature points. Annotations, in examples, can be merged and only occupied cells and position relative to occupied cells are maintained, which thereby compresses the data to save space. At block 2108, a global loop closure is performed. The global loop closure is adapting the environment representation and trajectory at any time. That means the relative position information for the submaps might change at any time. If, due to loop closure at block 2108, the position anchor and respectively the absolute position of the submap changes, the data object position is automatically adapted by getting new object position based on the object's submap data at block 2110. As the data objects are associated with the submaps, it is possible to recompute a new global position based on the latest global loop closure results. This is done, for example, continuously or iteratively as shown by the arrow 2112, such as every time the loop closure executes. This enables updating the global map and the attached data object positions in order to provide up-to-date correct information. The method 2100 can be repeated continuously in real-time or near-real-time throughout the mapping period (i.e., while scanning is being performed by the 3D measuring device 800). In some examples, the method 2100 can further include performing an initial registration to determine which submaps are adjacent to one another. This is performed using the data objects' position information for the submaps. Upon completion of the method 2100, a final data object position update is performed, and the data objects are persistently stored.

In one or more examples, one or more of the methods of FIGS. 15A, 17, and/or 21 are implemented by a 3D measuring device that includes a processor system, a 3D scanner, a 2D scanner, and a moveable platform (see, e.g., FIGS. 8 and 9). The processor system has at least one of a 3D scanner controller, a 2D scanner processor, an external computer, and a cloud computer configured for remote network access. Any of these processing elements within the processor system may include a single processor or multiple distributed processing elements, the processing elements being a microprocessor, digital signal processor, FPGA, or any other type of computing device. The processing elements have access to computer memory. The 3D scanner has a first light source, a first beam steering unit, a first angle measuring device, a second angle measuring device, and a first light receiver. The first light source is configured to emit a first beam of light, which in an embodiment is a beam of laser light. The first beam steering unit is provided to steer the first beam of light to a first direction onto a first object point. The beam steering unit may be a rotating mirror such as the mirror 26 or it may be another type of beam steering mechanism. For example, the 3D scanner may contain a base onto which is placed a first structure that rotates about a vertical axis, and onto this structure may be placed a second structure that rotates about a horizontal axis. With this type of mechanical assembly, the beam of light may be emitted directly from the second structure and point in a desired direction. Many other types of beam steering mechanisms are possible. In most cases, a beam steering mechanism includes one or two motors. The first direction is determined by a first angle of rotation about a first axis and a second angle of rotation about a second axis. The first angle measuring device is configured to measure the first angle of rotation and the second angle measuring device configured to measure the second angle of rotation. The first light receiver is configured to receive first reflected light, the first reflected light being a portion of the first beam of light reflected by the first object point. The first light receiver is further configured to produce a first electrical signal in response to the first reflected light. The first light receiver is further configured to cooperate with the processor system to determine a first distance to the first object point based at least in part on the first electrical signal, and the 3D scanner is configured to cooperate with the processor system to determine 3D coordinates of the first object point based at least in part on the first distance, the first angle of rotation and the second angle of rotation. The 2D scanner accessory includes a 2D scanner having a second light source, a second beam steering unit, a third angle measuring device, and a second light receiver. The second light source is configured to emit a second beam of light. The second beam steering unit is configured to steer the second beam of light to a second direction onto a second object point. The second direction is determined by a third angle of rotation about a third axis, the third angle measuring device being configured to measure the third angle of rotation. The second light receiver is configured to receive second reflected light, where the second reflected light is a portion of the second beam of light reflected by the second object point. The second light receiver is further configured to produce a second electrical signal in response to the second reflected light. The 2D scanner is configured to cooperate with the processor system to determine a second distance to the second object point based at least in part on the second electrical signal. The 2D scanner is further configured to cooperate with the processor system to determine 2D coordinates of the second object point based at least in part on the second distance and the third angle of rotation. The moveable platform is configured to carry the 3D scanner and the 2D scanner. The 3D scanner is fixed relative to the 2D scanner, and the moveable platform is configured for motion on a plane perpendicular to the third axis.

Terms such as processor, controller, computer, DSP, FPGA are understood in this document to mean a computing device that may be located within an instrument, distributed in multiple elements throughout an instrument, or placed external to an instrument.

While embodiments of the invention have been described in detail in connection with only a limited number of embodiments, it should be readily understood that the invention is not limited to such disclosed embodiments. Rather, the embodiments of the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the embodiments of the invention are not to be seen as limited by the foregoing description but is only limited by the scope of the appended claims.

What is claimed is:

1. A three-dimensional (3D) measuring device comprising:
   a processor system including at least one of a 3D scanner controller and a two-dimensional (2D) scanner processor;
   a 3D scanner operable to cooperate with the processor system to determine 3D coordinates;
   a 2D scanner accessory including a 2D scanner operable to cooperate with the processor system to determine 2D coordinates;
   a moveable platform operable to carry the 3D scanner and the 2D scanner, the 3D scanner being fixed relative to the 2D scanner;
   wherein the processor system is responsive to executable instructions which when executed by the processor system is operable to:
      cause the 3D scanner, while fixedly located at a scan position, to cooperate with the processor system to acquire a 3D scan of an environment, wherein the 3D scan comprises a global position and is partitioned into a plurality of submaps, each of the plurality of submaps comprising a position anchor;
      cause the 2D scanner to cooperate with the processor system to acquire a portion of a 2D map of the environment;
      cause the 2D scanner to determine coordinates of the scan position in the 2D map in response to the 3D scanner initiating the acquisition of the 3D scan;
      link the coordinates of the scan position with the portion of the 2D map;
      store submap data for each of the plurality of submaps into a data object associated with each of the plurality of submaps, wherein the submap data for each of the plurality of submaps comprises a data object position of the data object relative to the position anchor of the respective submap;
      perform a loop closure algorithm on each of the plurality of submaps; and
      for each of the plurality of submaps for which the position anchor of the submap changed during performing the loop closure algorithm, determine a new data object position for the data objects associated with each of the plurality of submaps for which the position anchor changed.

2. The 3D measuring device of claim 1, wherein the processor system further operable to create the data object for each of the plurality of submaps.

3. The 3D measuring device of claim 1, wherein determining the new relative position for the data objects associated with each of the plurality of submaps for which the position anchor changed is performed continuously or iteratively while acquiring the 3D scan of the environment.

4. The 3D measuring device of claim 1, wherein linking the coordinates of the scan position with the portion of the 2D map is performed in real-time and offline using timestamps and feature points.

5. The 3D measuring device of claim 1, wherein the processor system further operable to perform an initial registration of adjacent submaps of the plurality of submaps.

6. The 3D measuring device of claim 1, wherein performing loop closure further comprises adjusting a trajectory.

7. The 3D measuring device of claim 1, wherein the 2D scanner accessory further includes a position/orientation sensor, the position orientation sensor includes at least one sensor selected from the group consisting of an inclinometer, a gyroscope, a magnetometer, and an altimeter.

8. The 3D measuring device of claim 1, wherein the moveable platform is a tripod having wheels and a brake.

9. The 3D measuring device of claim 1, wherein the 3D scanner comprises a first light source, a first beam steering unit, a first angle measuring device, a second angle measuring device, and a first light receiver, the first light source operable to emit a first beam of light, the first beam steering unit operable to steer the first beam of light to a first direction onto a first object point, the first direction determined by a first angle of rotation about a first axis and a second angle of rotation about a second axis, the first angle measuring device operable to measure the first angle of rotation and the second angle measuring device operable to measure the second angle of rotation, the first light receiver operable to receive first reflected light, the first reflected light being a portion of the first beam of light reflected by the first object point, the first light receiver operable to produce a first electrical signal in response to the first reflected light, the first light receiver operable to cooperate with the processor system to determine a first distance to the first object point based at least in part on the first electrical signal, the 3D scanner operable to cooperate with the processor system to determine 3D coordinates of the first object point based at least in part on the first distance, the first angle of rotation and the second angle of rotation.

10. The 3D measuring device of claim 9, wherein the 2D scanner comprises a second light source, a second beam steering unit, a third angle measuring device, and a second light receiver, the second light source operable to emit a second beam of light, the second beam steering unit operable to steer the second beam of light to a second direction onto a second object point, the second direction determined by a third angle of rotation about a third axis, the third angle measuring device operable to measure the third angle of rotation, the second light receiver operable to receive second reflected light, the second reflected light being a portion of the second beam of light reflected by the second object point, the second light receiver operable to produce a second electrical signal in response to the second reflected light, the 2D scanner operable to cooperate with the processor system to determine a second distance to the second object point based at least in part on the second electrical signal, the 2D scanner further operable to cooperate with the processor system to determine 2D coordinates of the second object point based at least in part on the second distance and the third angle of rotation.

11. The 3D measuring device of claim 9, wherein the first beam steering unit includes a first mirror operable to rotate about a horizontal axis and a carriage that holds the first mirror operable to rotate about a vertical axis, the rotation about the horizontal axis being driven by a first motor and the rotation about the vertical axis being driven by a second motor.

12. The 3D measuring device of claim 1, wherein the loop closure algorithm determines a displacement vector, which is representative of an error in estimating the coordinates of the scan position.

13. A method for generating a three-dimensional (3D) map of an environment, the method comprising:
receiving, by a processor system, via a 3D scanner, which is fixedly located at a scan position, a 3D scan of the environment, wherein the 3D scan comprises a global position and is partitioned into a plurality of submaps, each of the plurality of submaps comprising a position anchor;
receiving, by the processor system, via a two-dimensional (2D) scanner accessory, a portion of a 2D map of the environment;
receiving, by the processor system, coordinates of the scan position in the 2D map in response to the 3D scanner initiating the acquisition of the 3D scan;
associating, by the processor system, the coordinates of the scan position with the portion of the 2D map;
linking, by the processor system, the coordinates of the scan position with the portion of the 2D map;
storing, by the processor system, submap data for each of the plurality of submaps into a data object associated with each of the plurality of submaps, wherein the submap data for each of the plurality of submaps comprises a data object position of the data object relative to the position anchor of the respective submap;
performing, by the processor system, a loop closure algorithm on each of the plurality of submaps; and
for each of the plurality of submaps for which the position anchor of the submap changed during performing the loop closure algorithm, determining, by the processor system, a new data object position for the data objects associated with each of the plurality of submaps for which the position anchor changed.

14. The method of claim 13, further comprising creating the data object for each of the plurality of submaps.

15. The method of claim 13, wherein determining the new relative position for the data objects associated with each of the plurality of submaps for which the position anchor changed is performed continuously or iteratively while acquiring the 3D scan of the environment.

16. The method of claim 13, wherein linking the coordinates of the scan position with the portion of the 2D map is performed in real-time and offline using timestamps and feature points.

17. The method of claim 13, wherein the processor system further operable to perform an initial registration of adjacent submaps of the plurality of submaps.

18. The method of claim 13, wherein the 2D scanner accessory further includes a position/orientation sensor, the position orientation sensor includes at least one sensor selected from the group consisting of an inclinometer, a gyroscope, a magnetometer, and an altimeter.

19. The method of claim 13, further comprising, mounting the 3D scanner and the 2D scanner accessory are on a moveable platform, the moveable platform being a tripod having wheels and a brake.

20. The method of claim 15, wherein the 3D scanner comprises a first light source, a first beam steering unit, a first angle measuring device, a second angle measuring device, and a first light receiver, the first light source operable to emit a first beam of light, the first beam steering unit operable to steer the first beam of light to a first direction onto a first object point, the first direction determined by a first angle of rotation about a first axis and a second angle of rotation about a second axis, the first angle measuring device operable to measure the first angle of rotation and the second angle measuring device operable to measure the second angle of rotation, the first light receiver operable to receive first reflected light, the first reflected light being a portion of the first beam of light reflected by the first object point, the first light receiver operable to produce a first electrical signal in response to the first reflected light, the first light receiver operable to cooperate with the processor system to determine a first distance to the first object point based at least in part on the first electrical signal, the 3D scanner operable to cooperate with the processor system to determine 3D coordinates of the first object point based at least in part on the first distance, the first angle of rotation and the second angle of rotation, and
wherein the 2D scanner comprises a second light source, a second beam steering unit, a third angle measuring device, and a second light receiver, the second light source operable to emit a second beam of light, the second beam steering unit operable to steer the second beam of light to a second direction onto a second object point, the second direction determined by a third angle of rotation about a third axis, the third angle measuring device operable to measure the third angle of rotation, the second light receiver operable to receive second reflected light, the second reflected light being a portion of the second beam of light reflected by the second object point, the second light receiver operable to produce a second electrical signal in response to the second reflected light, the 2D scanner operable to cooperate with the processor system to determine a second distance to the second object point based at least in part on the second electrical signal, the 2D scanner further operable to cooperate with the processor system to determine 2D coordinates of the second object point based at least in part on the second distance and the third angle of rotation.

* * * * *